United States Patent
Lemme et al.

(10) Patent No.: US 11,878,848 B2
(45) Date of Patent: Jan. 23, 2024

(54) SHEETLIKE COMPOSITE FOR PRODUCING DIMENSIONALLY STABLE FOOD AND DRINK PRODUCT CONTAINERS HAVING A POLYMER LAYER HAVING A RATIO OF AROMATIC GROUPS TO CARBONYL GROUPS

(71) Applicant: Sig Technology AG, Neuhausen am Rheinfall (CH)

(72) Inventors: Ulrich Lemme, Bedburg (DE); Andreas Lemsky, Troisdorf (DE); Dirk Schibull, Hückelhoven Baal (DE)

(73) Assignee: SIG Technology AG, Neuhausen am Rheinfall (CH)

(*) Notice: Subject to any disclaimer, the term of this patent is extended or adjusted under 35 U.S.C. 154(b) by 956 days.

(21) Appl. No.: 16/348,415

(22) PCT Filed: Nov. 8, 2017

(86) PCT No.: PCT/EP2017/078629
§ 371 (c)(1),
(2) Date: May 8, 2019

(87) PCT Pub. No.: WO2018/087156
PCT Pub. Date: May 17, 2018

(65) Prior Publication Data
US 2020/0071044 A1    Mar. 5, 2020

(30) Foreign Application Priority Data
Nov. 10, 2016  (DE) .................. 10 2016 222 128.0
Nov. 10, 2016  (DE) .................. 20 2016 006 881.5

(51) Int. Cl.
*B65D 65/40*    (2006.01)
*B32B 7/12*    (2006.01)
(Continued)

(52) U.S. Cl.
CPC ........... *B65D 65/40* (2013.01); *B32B 7/12* (2013.01); *B32B 15/085* (2013.01); *B32B 15/20* (2013.01);
(Continued)

(58) Field of Classification Search
CPC ......... B65D 65/40; B32B 7/12; B32B 15/085; B32B 15/20; B32B 27/10; B32B 27/16;
(Continued)

(56) References Cited

U.S. PATENT DOCUMENTS 5,731,396 A * 3/1998 Laas .................... C08G 18/706
                                                  524/839
8,964,317 B2    2/2015 Takano
(Continued)

FOREIGN PATENT DOCUMENTS

DE    102009050418 A1    4/2011
DE    102009050420 A1    5/2011
(Continued)

OTHER PUBLICATIONS

German Office Action, German Patent Application No. 102016222128.0; dated Jul. 11, 2017, German Patent and Trademark Office, 9 pages, English Translation only.
(Continued)

*Primary Examiner* — Ruiyun Zhang
(74) *Attorney, Agent, or Firm* — Taft Stettinius & Hollister LLP

(57) ABSTRACT

The invention relates to a sheetlike composite comprising, as layers of a layer sequence in the direction from an outer face of the sheetlike composite to an inner face of the sheetlike composite, a) a first polymer layer, b) a carrier layer, and c) a barrier layer, wherein the first polymer layer is characterized by a ratio of a proportion of aromatic groups in the first polymer layer to a proportion of carbonyl groups (Continued)

Figure 1:
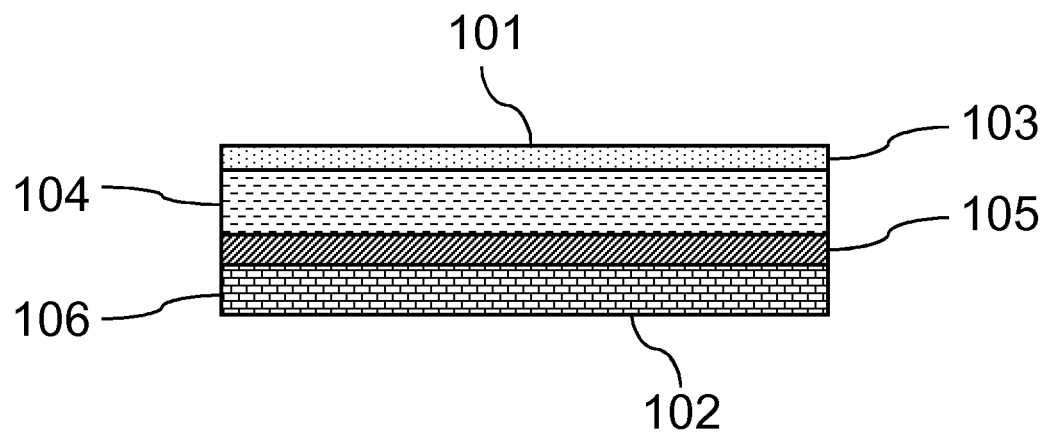

in the first polymer layer in a range from 0.18 to 0.34. The invention further relates to processes for producing a sheetlike composite, a container precursor and a closed container and to the aforementioned process products; to a further container precursor; to a further closed container; and to uses of the sheetlike composite, of a hardener and of a printing ink.

10 Claims, 9 Drawing Sheets

(51) Int. Cl.
  *B32B 15/085*   (2006.01)
  *B32B 15/20*   (2006.01)
  *B32B 27/10*   (2006.01)
  *B32B 27/16*   (2006.01)
  *B32B 27/20*   (2006.01)
  *B32B 27/32*   (2006.01)
  *B65B 3/02*   (2006.01)
  *B65B 3/04*   (2006.01)
  *B65B 7/18*   (2006.01)

(52) U.S. Cl.
  CPC .............. *B32B 27/10* (2013.01); *B32B 27/16* (2013.01); *B32B 27/20* (2013.01); *B32B 27/32* (2013.01); *B65B 3/025* (2013.01); *B65B 3/04* (2013.01); *B65B 7/18* (2013.01); *B32B 2255/12* (2013.01); *B32B 2255/26* (2013.01); *B32B 2264/102* (2013.01); *B32B 2307/4023* (2013.01); *B32B 2439/62* (2013.01); *B32B 2439/70* (2013.01)

(58) Field of Classification Search
  CPC ..... B32B 27/20; B32B 27/32; B32B 2255/12; B32B 2255/26; B32B 2264/102; B32B 2307/4023; B32B 2439/62; B32B 2439/70; B32B 2255/10; B32B 2307/308; B32B 2439/40; B32B 15/08; B32B 27/08; B32B 27/30; B32B 29/00; B32B 7/10; B32B 1/02; B32B 27/40; B32B 5/085; B32B 5/20; B65B 3/025; B65B 3/04; B65B 7/18
  USPC ..................................... 428/35.7, 35.8, 35.9
See application file for complete search history.

(56) References Cited

U.S. PATENT DOCUMENTS

| | | |
|---|---|---|
| 2002/0192459 A1 | 12/2002 | Bacon, Jr. |
| 2007/0203289 A1 | 8/2007 | Bruchmann et al. |
| 2011/0159292 A1 | 6/2011 | Eckel et al. |
| 2012/0258228 A1 | 10/2012 | Wolters et al. |
| 2012/0261295 A1 | 10/2012 | Wolters et al. |
| 2016/0311963 A1 | 10/2016 | Lobert et al. |

FOREIGN PATENT DOCUMENTS

| | | |
|---|---|---|
| JP | 2005212111 A | 8/2005 |
| JP | 2008239911 A | 10/2008 |
| JP | 2013222000 A | 10/2013 |
| WO | 9009926 A2 | 9/1990 |
| WO | 9702181 A1 | 1/1997 |
| WO | 2015107078 A1 | 7/2015 |
| WO | 2016001081 A1 | 1/2016 |

OTHER PUBLICATIONS

International Search Report and Written Opinion, International Patent Application No. PCT/EP2017/078629, dated Jan. 1, 2018, 8 pages.
Examination Report; European Patent Office; European Application No. 17808339.0; dated Jan. 31, 2022; 5 pages.
Office Action; Japanese Patent Office; Japanese Application No. 2019-524252; dated Oct. 8, 2021; 11 pages.

* cited by examiner

100

300

400

500

700

900

902 903

901

SHEETLIKE COMPOSITE FOR PRODUCING DIMENSIONALLY STABLE FOOD AND DRINK PRODUCT CONTAINERS HAVING A POLYMER LAYER HAVING A RATIO OF AROMATIC GROUPS TO CARBONYL GROUPS

CROSS-REFERENCE TO RELATED APPLICATIONS

This application is a U.S. National Phase of International PCT Application No. PCT/EP2017/078629 filed Nov. 8, 2017, which claims the benefit of German Patent Application Serial No. 10 2016 222 128.0 filed Nov. 10, 2016 and German Patent Application Serial No. 20 2016 006 881.5 filed Nov. 10, 2016, the contents of each application are incorporated herein by reference in their entirety.

The present invention relates to a sheetlike composite comprising, as layers of a layer sequence in the direction from an outer face of the sheetlike composite to an inner face of the sheetlike composite, a) a first polymer layer,
b) a carrier layer, and
c) a barrier layer, wherein the first polymer layer is characterized by a ratio of a proportion of aromatic groups in the first polymer layer to a proportion of carbonyl groups in the first polymer layer in a range from 0.18 to 0.34. The invention further relates to processes for producing a sheetlike composite, a container precursor and a closed container and to the aforementioned process products; to a further container precursor; to a further closed container; and to uses of the sheetlike composite, of a hardener and of a printing ink.

For some time, food and drink products, whether they be food and drink products for human consumption or else animal feed products, have been preserved by storing them either in a can or in a jar closed by a lid. In this case, the shelf life can be increased firstly by sterilizing the food or drink product and the container, here the jar or can, separately and to the greatest possible extent in each case, and then introducing the food or drink product into the container and closing the container. However, these measures for increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for this purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with the use of considerable transport volumes. Furthermore, jars and cans can be opened only with considerable expenditure of force or with the aid of tools and hence in a rather laborious manner. In the case of cans, there is a high risk of injury arising from sharp edges that occur on opening. In the case of jars, there are recurrent instances of broken glass getting into the food or drink product in the course of filling or opening of the filled jars, which in the worst case can lead to internal injuries when the food or drink product is consumed. In addition, both cans and jars have to be labelled for identification and promotion of the food or drink product contents. The jars and cans cannot readily be printed directly with information and promotional messages. In addition to the actual print, a substrate for it, a paper or a suitable film, and a securing means, an adhesive or a sealant, are thus needed.

Other packaging systems for storing food and drink products over a long period with minimum impairment are known from the prior art. These are containers produced from sheetlike composites—frequently also referred to as laminates. Sheetlike composites of this kind are frequently constructed from a thermoplastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, by contrast with film bags, can be regarded as a further development of the aforementioned jars and cans.

Here, these laminate containers already have many advantages over the conventional jars and cans. Nevertheless, there are opportunities for improvement in the case of these packaging systems too. For instance, instead of having labels adhesively attached, these containers are typically provided with printed images or colour decorations, which apart from providing information about the content of the containers are also intended to evoke important aesthetic impressions for the end user of the food and drink products located in the containers. It is particularly disadvantageous when these printed images suffer as a result of the usually drastic conditions during preservation by means of autoclaving. This requirement conflicts with the other requirement of the food and drink product containers for a longest possible shelf life for a wide variety of different food and drink products. The shelf life of certain food and drink products is prolonged by dispensing and treating them in what is called the "hot fill process" (cf. Ullmann's Encyclopaedia of Industrial Chemistry, Vol. A 11, "FOODS", 2., Food Technology, 1988, pages 549 and 552, VCH Verlagsgesellschaft Weinheim). To protect the colour decoration in such a process, it is customary in the prior art to use a protective coating applied over the colour layer.

In general terms, it is an object of the present invention to at least partly overcome a disadvantage that arises from the prior art. It is a further object of the invention to provide a dimensionally stable laminate food and drink product container containing a printed image or colour decoration, wherein the container and the food or drink product situated therein have a longest possible shelf life and, at the same time, the printed image or colour decoration is as much as possible undamaged and shows intensest possible colours. Thus, it is intended that the printed image or colour decoration preferably not be scratched, detached or washed out. Here, it is especially an object of the invention to provide the aforementioned advantageous container, wherein the printed image or colour decoration can be applied by intaglio printing. Furthermore, it is an object of the invention to provide the aforementioned advantageous laminate container, wherein the laminate has a simplest possible construction, more particularly fewest possible layers. It is a further object of the invention to provide the aforementioned advantageous container, wherein it is obtainable by a production process having greatest possible energy savings. Furthermore, the advantageous container is preferably obtainable by a production process having highest possible processing speed. Furthermore, the advantageous container is preferably obtainable by a production process which requires minimal maintenance. It is a further object of the invention to provide a laminate for producing dimensionally stable food and drink product containers, which laminate has a colour decoration having a highest possible mechanical stability, especially at elevated temperature and humidity. Here, the colour decoration is preferably resistant to autoclaving to the greatest possible extent. The aforementioned colour decoration is preferably applied by intaglio printing.

A contribution to the at least partial achievement of at least one, preferably more than one, of the above objects is made by the independent claims. The dependent claims provide preferred embodiments which contribute to the at least partial achievement of at least one of the objects.

A contribution to the achievement of at least one of the objects of the invention is made by an embodiment 1 of a sheetlike composite 1 comprising, as layers of a layer sequence in the direction from an outer face of the sheetlike composite to an inner face of the sheetlike composite,
   a) a first polymer layer,
   b) a carrier layer, and
   c) a barrier layer,
wherein the first polymer layer is characterized by a ratio of a proportion of aromatic groups in the first polymer layer to a proportion of carbonyl groups in the first polymer layer in a range from 0.18 to 0.34, preferably from 0.19 to 0.33, more preferably from 0.20 to 0.32, more preferably from 0.21 to 0.31, more preferably from 0.22 to 0.30, more preferably from 0.23 to 0.29, most preferably from 0.24 to 0.28.

In an embodiment 2 according to the invention, the sheetlike composite 1 is configured according to embodiment 1, wherein the first polymer layer is further characterized by a ratio of a proportion of aliphatic groups in the first polymer layer to the proportion of carbonyl groups in the first polymer layer in a range from 0.40 to 0.60, preferably from 0.41 to 0.59, more preferably from 0.42 to 0.58, most preferably from 0.43 to 0.55.

In an embodiment 3 according to the invention, the sheetlike composite 1 is configured according to embodiment 1 or 2, wherein the first polymer layer further comprises a first colourant in a proportion in a range from 10 to 50% by weight, preferably from 12 to 48% by weight, more preferably from 15 to 45% by weight, more preferably from 17 to 43% by weight, most preferably from 20 to 40% by weight, based in each case on the weight of the first polymer layer.

In an embodiment 4 according to the invention, the sheetlike composite 1 is configured according to any of the preceding embodiments, wherein the first polymer layer has an L* value in the L*a*b* colour system of at least 80, preferably of at least 82, more preferably of at least 84, more preferably of at least 86, most preferably of at least 88.

In an embodiment 5 according to the invention, the sheetlike composite 1 is configured according to any of the preceding embodiments, wherein the sheetlike composite comprises a further polymer layer between the first polymer layer and the carrier layer. Preferably, the first polymer layer adjoins the further polymer layer. Additionally or alternatively, the carrier layer preferably adjoins the further polymer layer.

In an embodiment 6 according to the invention, the sheetlike composite 1 is configured according to any of the preceding embodiments, wherein the first polymer layer comprises at least one polyurethane.

In an embodiment 7 according to the invention, the sheetlike composite 1 is configured according to embodiment 6, wherein the polyurethane is obtainable by a polyaddition
   a) of a first di- or polyisocyanate, and
   b) of a second di- or polyisocyanate
with at least one di- or polyol, wherein the first di- or polyisocyanate comprises the aromatic groups.

In an embodiment 8 according to the invention, the sheetlike composite 1 is configured according to embodiment 7, wherein the first di- or polyisocyanate comprises tolylene diisocyanate. Preferably, the first di- or polyisocyanate is tolylene diisocyanate.

In an embodiment 9 according to the invention, the sheetlike composite 1 is configured according to embodiment 7 or 8, wherein the second di- or polyisocyanate comprises the aliphatic groups.

In an embodiment 10 according to the invention, the sheetlike composite 1 is configured according to any of embodiments 7 to 9, wherein the second di- or polyisocyanate comprises hexamethylene diisocyanate (HDI). Preferably, the second di- or polyisocyanate is hexamethylene diisocyanate. Preferably, the HDI is of the biuret type.

In an embodiment 11 according to the invention, the sheetlike composite 1 is configured according to any of embodiments 7 to 10, wherein the di- or polyol comprises a trimethylolpropane or a polyester comprising OH groups or a mixture of the two. Preferably, the di- or polyol is trimethylolpropane or a polyester comprising OH groups or a mixture thereof.

In an embodiment 12 according to the invention, the sheetlike composite 1 is configured according to any of embodiments 6 to 11, wherein the first polymer layer comprises an additional polymer different from the polyurethane.

In an embodiment 13 according to the invention, the sheetlike composite 1 is configured according to embodiment 12, wherein the additional polymer is selected from the group consisting of polyvinyl chloride, cellulose acetate butyrate, polyadipate and polyolefin wax or a mixture of at least two of these. A preferred polyolefin wax is a polyethylene wax or a polypropylene wax or both. Furthermore, a preferred polyolefin wax is characterized by a melting point or a dropping point or both in a range from 85 to 165° C., preferably from 90 to 160° C., more preferably from 100 to 150° C.

In an embodiment 14 according to the invention, the sheetlike composite 1 is configured according to any of the preceding embodiments, wherein the first polymer layer is overlaid by a first colour application on a side of the first polymer layer that is facing away from the carrier layer. Preferably, the first colour application directly adjoins the first polymer layer.

In an embodiment 15 according to the invention, the sheetlike composite 1 is configured according to embodiment 14, wherein the first colour application comprises a second colourant, wherein the second colourant is different from the first colourant. Preferably, the second colourant has a different colour than the first colourant.

In an embodiment 16 according to the invention, the sheetlike composite 1 is configured according to any of the preceding embodiments, wherein the first polymer layer is overlaid by at least one further colour application, preferably at least 2 further colour applications, more preferably at least 3 further colour applications, more preferably at least 4 further colour applications, most preferably at least 5 further colour applications, on a side of the first polymer layer that is facing away from the carrier layer. Preferably, at least one further colour application, more preferably each further colour application, directly adjoins the first polymer layer.

In an embodiment 17 according to the invention, the sheetlike composite 1 is configured according to embodiment 16, wherein each further colour application comprises in each case a further colourant, wherein each further colourant is different from the first colourant and the second colourant. In the case of multiple further colourants, these are preferably in each case different from one another and from the second colourant and the first colourant. Here, colourants different from one another preferably have colours different from another.

In an embodiment 18 according to the invention, the sheetlike composite 1 is configured according to any of embodiments 14 to 17, wherein the first polymer layer overlays the carrier layer at least in part with a first maximal area coverage, wherein the first colour application overlays the carrier layer at least in part with a second maximal area coverage, wherein the first maximal area coverage is greater than the second maximal area coverage. Preferably, the first maximal area coverage is greater than the second maximal area coverage by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. Preferably, at least one further colour application, preferably at least two further colour applications, more preferably at least three further colour applications, more preferably at least 4 further colour applications, more preferably at least 5 further colour applications, most preferably at least 6 further colour applications, overlays the carrier layer at least in part with a maximal area coverage which is less than the first maximal area coverage. Preferably, the maximal area coverage of at least one further colour application, preferably at least two further colour applications, more preferably at least three further colour applications, more preferably at least 4 further colour applications, more preferably at least 5 further colour applications, most preferably at least 6 further colour applications, is less than the first maximal area coverage by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. The maximal area coverages specified herein are preferably based on a portion of a surface of the carrier layer, which surface is facing the first polymer layer.

In an embodiment 19 according to the invention, the sheetlike composite 1 is configured according to any of the preceding embodiments, wherein the first polymer layer overlays the carrier layer at least in part with a first maximal area coverage in a range from 65 to 100%, preferably from 70 to 100%, more preferably from 75 to 100%, more preferably from 80 to 100%, more preferably from 85 to 100%, more preferably from 90 to 100%, most preferably from 95 to 100%.

In an embodiment 20 according to the invention, the sheetlike composite 1 is configured according to any of embodiments 14 to 19, wherein the first colour application overlays the carrier layer at least in part with a second maximal area coverage in a range from 0.1 to 95%, preferably from 1 to 95%, more preferably from 5 to 95%, more preferably from 10 to 95%, more preferably from 10 to 90%, more preferably from 10 to 85%, more preferably from 10 to 80%, more preferably from 10 to 75%, most preferably from 15 to 75%.

In an embodiment 21 according to the invention, the sheetlike composite 1 is configured according to any of embodiments 14 to 20, wherein the outer face of the sheetlike composite comprises at least one surface of the first colour application. Preferably, the outer face additionally or alternatively comprises a surface of at least one further colour application, more preferably in each case a surface of each further colour application.

In an embodiment 22 according to the invention, the sheetlike composite 1 is configured according to any of the preceding embodiments, wherein no layer of the sheetlike composite overlays more than 90%, preferably more than 85%, more preferably more than 80%, most preferably more than 76%, of a surface of the first polymer layer on a side of the first polymer layer that is facing away from the carrier layer.

In an embodiment 23 according to the invention, the sheetlike composite 1 is configured according to any of the preceding embodiments, wherein the sheetlike composite further comprises an inner polymer layer, wherein the inner polymer layer overlays the barrier layer on a side of the barrier layer that is facing the inner face of the sheetlike composite. Preferably, the inner polymer layer comprises a polymer produced by means of a metallocene catalyst to an extent of 10 to 90% by weight, preferably to an extent of 25 to 90% by weight, more preferably to an extent of 30 to 80% by weight, based in each case on the total weight of the inner polymer layer. In a further preferred embodiment, the inner polymer layer comprises a polymer blend, wherein the polymer blend comprises an mPE to an extent of 10 to 90% by weight, preferably to an extent of 25 to 90% by weight, more preferably to an extent of 30 to 80% by weight, and a further polymer to an extent of at least 10% by weight, preferably to an extent of at least 15% by weight, more preferably to an extent of at least 20% by weight, based in each case on the total weight of the polymer blend.

In an embodiment 24 according to the invention, the sheetlike composite 1 is configured according to any of the preceding embodiments, wherein the sheetlike composite comprises an intermediate polymer layer between the carrier layer and the barrier layer. A preferred intermediate polymer layer comprises an LDPE to an extent of at least 50% by weight, more preferably to an extent of at least 60% by weight, more preferably to an extent of at least 70% by weight, more preferably to an extent of at least 80% by weight, most preferably to an extent of at least 90% by weight, based in each case on the weight of the intermediate polymer layer.

In an embodiment 25 according to the invention, the sheetlike composite 1 is configured according to any of the preceding embodiments, wherein the carrier layer has at least one hole, wherein the hole is covered at least by the barrier layer. Preferably, the hole is further covered by a layer selected from the group consisting of the inner polymer layer, the further polymer layer and the intermediate polymer layer or a combination of at least two of these. Layers covering the hole are referred to herein as hole-covering layers. If at least 2 hole-covering layers are present, the hole-covering layers in the hole preferably form a layer sequence of layers bonded to one another in the hole.

In an embodiment 26 according to the invention, the sheetlike composite 1 is configured according to any of the preceding embodiments, wherein the carrier layer comprises one selected from the group consisting of cardboard, paperboard, and paper, or a combination of at least two of these.

In a further embodiment according to the invention, the sheetlike composite 1 is configured according to any of the preceding embodiments, wherein the first polymer layer overlays 65 to 100%, preferably 70 to 100%, more preferably 75 to 95%, more preferably 80 to 95%, most preferably 80 to 88%, of a surface of the carrier layer on a side of the carrier layer that is facing away from the barrier layer.

A contribution to the achievement of at least one of the objects of the invention is made by an embodiment 1 of a process 1 comprising, as process steps,
 a) providing a sheetlike composite precursor comprising, as mutually superposing layers of a layer sequence,
  i) a carrier layer, and
  ii) a barrier layer;
 b) overlaying the carrier layer with a liquid first polymer layer precursor composition on a side facing away from the barrier layer,
  wherein the liquid first polymer layer precursor composition is characterized by a ratio of a proportion of aromatic groups in the liquid first polymer layer precursor composition to a proportion of aliphatic groups in the liquid first polymer layer precursor composition in a range from 0.30 to 0.80, preferably from 0.33 to 0.77, more preferably from 0.35 to 0.75, most preferably from 0.37 to 0.73.

The overlaying in process step b) is preferably effected as a printing process. A preferred printing process is one selected from the group consisting of relief printing, offset printing, flexographic printing and intaglio printing or a combination of at least two of these.

In an embodiment 2 according to the invention, the process 1 is configured according to its embodiment 1, wherein the liquid first polymer layer precursor composition comprises
 a. a first di- or polyisocyanate,
 b. a second di- or polyisocyanate, and
 c. at least one di- or polyol
wherein the first di- or polyisocyanate comprises the aromatic groups. Preferably, the liquid first polymer layer precursor composition comprises a further di- or polyol.

In an embodiment 3 according to the invention, the process 1 is configured according to its embodiment 2, wherein the first di- or polyisocyanate comprises tolylene diisocyanate. Preferably, the first di- or polyisocyanate is tolylene diisocyanate.

In an embodiment 4 according to the invention, the process 1 is configured according to its embodiment 2 or 3, wherein the second di- or polyisocyanate comprises the aliphatic groups.

In an embodiment 5 according to the invention, the process 1 is configured according to any of its embodiments 2 to 4, wherein the second di- or polyisocyanate comprises hexamethylene diisocyanate. Preferably, the second di- or polyisocyanate is hexamethylene diisocyanate.

In an embodiment 6 according to the invention, the process 1 is configured according to any of its embodiments 2 to 5, wherein the di- or polyol comprises a trimethylolpropane or a polyester comprising OH groups or a mixture of the two, preferably consists thereof.

In an embodiment 7 according to the invention, the process 1 is configured according to any of its embodiments 1 to 6, wherein the first polymer layer precursor composition comprises at least one polymer.

In an embodiment 8 according to the invention, the process 1 is configured according to its embodiment 7, wherein the at least one polymer is selected from the group consisting of a polyurethane, polyvinyl chloride, cellulose acetate butyrate, polyadipate and polyolefin wax or a mixture of at least two of these.

In an embodiment 9 according to the invention, the process 1 is configured according to its embodiment 7 or 8, wherein the liquid first polymer layer precursor composition comprises the at least one polymer in a proportion in a range from 0.1 to 25% by weight, preferably from 0.5 to 20% by weight, more preferably from 1 to 15% by weight, more preferably from 2 to 10% by weight, more preferably from 4 to 7% by weight, based in each case on the weight of the liquid first polymer layer precursor composition.

In an embodiment 10 according to the invention, the process 1 is configured according to any of its embodiments 1 to 9, wherein the liquid first polymer layer precursor composition in the overlaying in process step b) further comprises a first colourant in a proportion in a range from 5 to 25% by weight, preferably from 7 to 20% by weight, more preferably from 9 to 15% by weight, based in each case on the weight of the liquid first polymer layer precursor composition. A preferred first colourant is a first pigment. A preferred first pigment is $TiO_2$.

In an embodiment 11 according to the invention, the process 1 is configured according to any of its embodiments 1 to 10, wherein the liquid first polymer layer precursor composition in the overlaying in process step b) further comprises a solvent in a range from 40 to 80% by weight, preferably from 50 to 75% by weight, more preferably from 55 to 70% by weight, based in each case on the weight of the liquid first polymer layer precursor composition. A preferred solvent is a carboxylic ester, more preferably an ethyl acetate.

In an embodiment 12 according to the invention, the process 1 is configured according to its embodiment 10 or 11, wherein the liquid first polymer layer precursor composition is obtainable by contacting a first composition component with a further composition component before process step b), wherein the first composition component comprises the first colourant, wherein the further composition component comprises the aromatic groups or the aliphatic groups or both.

In an embodiment 13 according to the invention, the process 1 is configured according to any of its embodiments 1 to 12, wherein the process further comprises a process step of
 c) hardening of the liquid first polymer layer precursor composition, thereby obtaining a first polymer layer of a sheetlike composite,
wherein the hardening takes place at a temperature of the liquid first polymer layer precursor composition and of the first polymer layer in a range from 10 to 45° C., preferably from 15 to 40° C., more preferably from 15 to 35° C., most preferably from 18 to 30° C.

In an embodiment 14 according to the invention, the process 1 is configured according to any of its embodiments 1 to 13, wherein the overlaying in process step b) is effected by contacting the sheetlike composite precursor with a first printing form surface of a first printing form. A preferred first printing form is an intaglio printing form.

In an embodiment 15 according to the invention, the process 1 is configured according to its embodiment 14, wherein the first printing form surface comprises a first multitude of recesses, wherein the recesses of the first multitude of recesses for the overlaying in process step b) comprise at least some of the liquid first polymer layer precursor composition.

In an embodiment 16 according to the invention, the process 1 is configured according to its embodiment 15, wherein the recesses of the first multitude of recesses each have a first holding volume in a range from 5 to 15 ml per m², preferably from 6 to 13 ml per m², more preferably from 7 to 12 ml per m², most preferably from 8 to 11 ml per m², of the first printing form surface in each case.

In an embodiment 17 according to the invention, the process 1 is configured according to its embodiment 15 or 16, wherein the recesses of the first multitude of recesses are arranged on the first printing form surface in a first pattern, wherein the first pattern has a first number of grid lines per cm on a straight line perpendicular to the grid lines on the first printing form surface in a range from 50 to 85, preferably from 55 to 80, more preferably from 60 to 75.

In an embodiment 18 according to the invention, the process 1 is configured according to any of its embodiments 1 to 17, wherein the sheetlike composite precursor is moved at a speed in a range from 200 to 1000 m/min, preferably from 250 to 700 m/min, more preferably from 300 to 600 m/min, during the overlaying in process step b).

In an embodiment 19 according to the invention, the process 1 is configured according to any of its embodiments 1 to 18, wherein the overlaying in process step b) is effected by an application to an outer surface of the sheetlike composite precursor, wherein, before the process step b), a surface tension of the outer surface is altered, preferably increased, by means of a surface treatment to a value in a range from 36 to 44 dyn/cm, preferably from 38 to 44 dyn/cm, more preferably from 40 to 42 dyn/cm. A preferred surface treatment is one selected from the group consisting of a flame treatment, a fluorination, a plasma treatment and a corona treatment or a combination of at least two of these. If a surface tension is too low, the first polymer layer detaches too readily, whereas there are organoleptic disadvantages if a surface tension is too high, especially when the sheetlike composites obtained are stored for relatively long periods as rolls or stacks.

In general, the corona treatment is an electrochemical process for treating surfaces, preferably polymer surfaces. Preferably, the outer surface of the sheetlike composite precursor is exposed in to an electrical high-voltage discharge during the corona treatment. The electrical high-voltage discharge is preferably generated between a first and a further electrode. The first electrode is preferably a roll, preferably a metal roll, preferably having a polished roll surface. A preferred roll surface consists of steel or aluminium or both. Further preferably, the first electrode is earthed and the further electrode not. Alternatively, the further electrode can be earthed and the first electrode not. During the corona treatment, the outer surface is preferably facing at least in part the first electrode. Yet more preferably, during the corona treatment, the outer surface is in physical contact with the first electrode. The unearthed electrode is preferably connected in an electrically conducting manner to a high-frequency generator which is preferably designed to generate an alternating voltage in a range from 10 to 20 kV, preferably having a frequency in a range from 10 to 60 kHz.

In an embodiment 20 according to the invention, the process 1 is configured according to its embodiment 19, wherein the surface treatment is a corona treatment, wherein the corona treatment is characterized by a parameter A in a range from 3 to 20 W·min/m, preferably from 3 to 18 W·min/m, more preferably from 4 to 16 W·min/m, wherein the parameter A is a quotient of an input power of the corona treatment in W and a speed of a movement of the sheetlike composite precursor during the corona treatment in m/min. Here, the movement is preferably a translation. Particularly preferably, the corona treatment is done with an input power in a range from 2000 to 4800 W, more preferably from 2500 W to 4800 W, most preferably from 3000 to 4500 W. Preferably, the sheetlike composite precursor is in this connection moved at a speed in a range from 200 to 1000 m/min, more preferably from 250 to 700 m/min, most preferably from 300 to 600 m/min.

In an embodiment 21 according to the invention, the process 1 is configured according to any of its embodiments 1 to 20, wherein the process further comprises a process step of
  d) overlaying of the carrier layer with a liquid first colour application precursor composition on a side facing away from the barrier layer.

The overlaying in process step d) is preferably effected as a printing process. A preferred printing process is one selected from the group consisting of relief printing, flexographic printing and intaglio printing or a combination of at least two of these.

In an embodiment 22 according to the invention, the process 1 is configured according to its embodiment 21, wherein the liquid first colour application precursor composition in the overlaying in process step d) comprises a second colourant, wherein the second colourant is different from the first colourant.

In an embodiment 23 according to the invention, the process 1 is configured according to its embodiment 21 or 22, wherein the process further comprises a process step of
  e) overlaying of the carrier layer with at least one liquid further colour application precursor composition on the side facing away from the barrier layer.

The overlaying in process step e) is preferably effected as a printing process. A preferred printing process is one selected from the group consisting of relief printing, flexographic printing and intaglio printing or a combination of at least two of these.

In an embodiment 24 according to the invention, the process 1 is configured according to its embodiment 23, wherein each liquid further colour application precursor composition comprises in each case a further colourant, wherein the further colourant is in each case different from the first colourant and the second colourant. Preferably, the colourants each differ in their colour. The first colourant is preferably white.

In an embodiment 25 according to the invention, the process 1 is configured according to any of its embodiments 21 to 24, wherein the overlaying in process step d) is effected by contacting the sheetlike composite precursor with a second printing form surface of a second printing form. Preferably, the overlaying in process step e) is achieved by contacting the sheetlike composite precursor with at least one further printing form surface of at least one further printing form.

In an embodiment 26 according to the invention, the process 1 is configured according to its embodiment 25, wherein the second printing form surface comprises a second multitude of recesses, wherein the recesses of the second multitude of recesses for the overlaying in process step d) comprise at least some of the liquid first colour application precursor composition. Preferably, each further printing form surface comprises in each case a further multitude of recesses, wherein the recesses of each further multitude of recesses for the overlaying in process step e) comprise in each case at least some of the liquid further colour application precursor composition.

In an embodiment 27 according to the invention, the process 1 is configured according to its embodiment 26, wherein the recesses of the first multitude of recesses each have a first holding volume, wherein the recesses of the second multitude of recesses each have a second holding volume, wherein the first holding volume is less than the second holding volume. Preferably, the first holding volume is less than the second holding volume by at least 0.5 ml per $m^2$, more preferably by at least 1 ml per $m^2$. Preferably, the second holding volume is in a range from 6 to 16 ml per $m^2$, preferably from 7 to 14 ml per $m^2$, more preferably from 8 to 13 ml per $m^2$, most preferably from 9 to 12 ml per $m^2$, of the second printing form surface in each case. Preferably, the recesses of the first multitude of recesses each have a first holding volume, wherein the recesses of each further multitude of recesses each have a further holding volume, wherein the first holding volume is less than each of the further holding volumes. Preferably, the first holding volume is less than each of the further holding volumes by at least 0.5 ml per $m^2$, more preferably by at least 1 ml per $m^2$. Preferably, each further holding volume is in a range from 6 to 16 ml per $m^2$, preferably from 7 to 14 ml per $m^2$, more preferably from 8 to 13 ml per $m^2$, most preferably from 9 to 12 ml per $m^2$, of the respective further printing form surface in each case.

In an embodiment 28 according to the invention, the process 1 is configured according to its embodiment 26 or 27, wherein the recesses of the first multitude of recesses are arranged on the first printing form surface in a first pattern, wherein the first pattern has a first number of grid lines per cm on a straight line perpendicular to the grid lines on the first printing form surface, wherein the recesses of the second multitude of recesses are arranged on the second printing form surface in a second pattern, wherein the second pattern has a second number of grid lines per cm on a straight line perpendicular to the grid lines on the second printing form surface, wherein the first number is greater than the second number. Preferably, the second number is in a range from 45 to 65 grid lines per cm, more preferably from 50 to 65 grid lines per cm, most preferably from 55 to 65 grid lines per cm, in each case on a straight line perpendicular to the grid lines on the second printing form surface. Preferably, the recesses of the first multitude of recesses are arranged on the first printing form surface in a first pattern, wherein the first pattern has a first number of grid lines per cm on a straight line perpendicular to the grid lines on the first printing form surface, wherein the recesses of each further multitude of recesses are arranged on the respective further printing form surface in a respective further pattern, wherein each further pattern has a respective further number of grid lines per cm on a straight line perpendicular to the grid lines on the respective further printing form surface, wherein the first number is greater than each further number. Preferably, each further number is in a range from 45 to 65 grid lines per cm, more preferably from 50 to 65 grid lines per cm, most preferably from 55 to 65 grid lines per cm, in each case on a straight line perpendicular to the grid lines on the respective further printing form surface.

In an embodiment 29 according to the invention, the process 1 is configured according to any of its embodiments 21 to 28, wherein, in process step b), the carrier layer is overlaid with the liquid first polymer layer precursor composition at least in part to give a first maximal area coverage, wherein, in process step d), the carrier layer is overlaid with the liquid first colour application precursor composition at least in part to give a second maximal area coverage, wherein the first maximal area coverage is greater than the second maximal area coverage. Preferably, the first maximal area coverage is greater than the second maximal area coverage by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. Preferably, in process step e), the carrier layer is overlaid with the at least one liquid further colour application precursor composition at least in part to give a further maximal area coverage, wherein the first maximal area coverage is greater than the further maximal area coverage. Preferably, the first maximal area coverage is greater than the further maximal area coverage by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. The maximal area coverages specified herein are preferably based on the side of the carrier layer that is facing away from the barrier layer.

In an embodiment 30 according to the invention, the process 1 is configured according to any of its embodiments 1 to 29, wherein, in process step b), the carrier layer is overlaid with the liquid first polymer layer precursor composition at least in part to give a first maximal area coverage in a range from 65 to 100%, preferably from 70 to 100%, more preferably from 75 to 100%, more preferably from 80 to 100%, more preferably from 85 to 100%, more preferably from 90 to 100%, most preferably from 95 to 100%.

In a further embodiment according to the invention, the process 1 is configured according to any of its embodiments 1 to 30, wherein, in process step b), 65 to 100%, preferably 70 to 100%, more preferably 75 to 95%, more preferably 80 to 95%, most preferably 80 to 88%, of a surface of the carrier layer are overlaid with the liquid first polymer layer precursor composition on a side of the carrier layer that is facing away from the barrier layer.

In an embodiment 31 according to the invention, the process 1 is configured according to any of its embodiments 21 to 30, wherein, in process step d), the carrier layer is overlaid with the liquid first colour application precursor composition at least in part to give a second maximal area coverage in a range from 0.1 to 95%, preferably from 1 to 95%, more preferably from 5 to 95%, more preferably from 10 to 95%, more preferably from 10 to 90%, more preferably from 10 to 85%, more preferably from 10 to 80%, more preferably from 10 to 75%, most preferably from 15 to 75%.

In an embodiment 32 according to the invention, the process 1 is configured according to any of its embodiments 1 to 31, wherein a first polymer layer is obtained as a result of hardening of the liquid first polymer layer precursor composition, wherein the first polymer layer is, on a side of the first polymer layer that is facing away from the carrier layer, overlaid with no layer of the sheetlike composite on more than 90%, preferably more than 85%, more preferably more than 80%, most preferably more than 76%, of a surface of the first polymer layer in each case.

In an embodiment 33 according to the invention, the process 1 is configured according to any of its embodiments 1 to 32, wherein the sheetlike composite precursor comprises an intermediate polymer layer between the carrier layer and the barrier layer.

In an embodiment 34 according to the invention, the process 1 is configured according to any of its embodiments 1 to 33, wherein, before process step b), the carrier layer is overlaid with a further polymer layer on a side facing away from the barrier layer, wherein the overlaying in process step b) is effected on a side of the further polymer layer that is facing away from the carrier layer. Preferably, the overlaying in process step b) is effected by an application directly to a surface of the further polymer layer that is facing away from the carrier layer. Here, this surface of the further polymer layer is preferably an outer surface of the sheetlike composite precursor.

In an embodiment 35 according to the invention, the process 1 is configured according to any of its embodiments 1 to 34, wherein the process further comprises a process step I., wherein, in process step I., the barrier layer is overlaid with an inner polymer composition on a side of the barrier layer that is facing away from the carrier layer. Preferably, the inner polymer composition comprises a polymer produced by means of a metallocene catalyst to an extent of 10% to 90% by weight, preferably to an extent of 25% to 90% by weight, more preferably to an extent of 30% to 80% by weight, based in each case on the total weight of the inner polymer composition. In a further preferred embodiment, the inner polymer composition comprises a polymer blend, wherein the polymer blend comprises an mPE to an extent of 10% to 90% by weight, preferably to an extent of 25% to 90% by weight, more preferably to an extent of 30% to 80% by weight, and a further polymer to an extent of at least 10% by weight, preferably to an extent of at least 15% by weight, more preferably to an extent of at least 20% by weight, based in each case on the total weight of the polymer blend. The overlaying with the inner polymer composition can be effected before, after, simultaneously with or overlapping in time with process step b). Preferably, the overlaying with the inner polymer composition precedes process step b).

In an embodiment 36 according to the invention, the process 1 is configured according to any of its embodiments 1 to 35, wherein at least one hole is generated in the carrier layer before process step b), wherein the hole is covered at least by the barrier layer. Preferably, the hole is further covered by a layer selected from the group consisting of the inner polymer layer, the further polymer layer and the intermediate polymer layer or a combination of at least two of these.

In an embodiment 37 according to the invention, the process 1 is configured according to any of its embodiments 1 to 36, wherein a perforation is introduced into the carrier layer after process step b). Preferably, the perforation is introduced after process step c), more preferably after process step d). Preferably, the perforation is introduced by means of electromagnetic waves, preferably by means of a laser beam. In a further preferred embodiment, the perforation is introduced by contacting with a perforation tool, preferably a punching tool.

In an embodiment 38 according to the invention, the process 1 is configured according to any of its embodiments 1 to 37, wherein the carrier layer comprises one selected from the group consisting of cardboard, paperboard, and paper, or a combination of at least two of these.

A contribution to the achievement of at least one of the objects of the invention is made by an embodiment 1 of a sheetlike composite 2 obtainable by the process 1 according to any of its embodiments 1 to 38.

A contribution to the achievement of at least one of the objects of the invention is made by an embodiment 1 of a container precursor 1 comprising the sheetlike composite 1 or 2, in each case according to any of its embodiments above.

In an embodiment 2 according to the invention, the container precursor 1 is configured according to its embodiment 1, wherein the sheetlike composite comprises at least 3, preferably at least 4, folds.

In an embodiment 3 according to the invention, the container precursor 1 is configured according to its embodiment 1 or 2, wherein the sheetlike composite comprises a first longitudinal rim and a further longitudinal rim, wherein the first longitudinal rim is joined to the further longitudinal rim forming a longitudinal seam of the container precursor.

A contribution to the achievement of at least one of the objects of the invention is made by an embodiment 1 of a closed container 1 comprising the sheetlike composite 1 or 2, in each case according to any of its embodiments above.

In an embodiment 2 according to the invention, the closed container 1 is configured according to its embodiment 1, wherein the sheetlike composite comprises a first longitudinal rim and a further longitudinal rim, wherein the first longitudinal rim is joined to the further longitudinal rim forming a longitudinal seam of the closed container.

In an embodiment 3 according to the invention, the closed container 1 is configured according to its embodiment 1 or 2, wherein the closed container comprises a food or drink product.

A contribution to the achievement of at least one of the objects of the invention is made by an embodiment 1 of a process 2 comprising, as process steps,
 a. providing the sheetlike composite 1 or 2, in each case according to any of its embodiments above, comprising a first longitudinal rim and a further longitudinal rim;
 b. folding the sheetlike composite; and
 c. contacting and joining the first longitudinal rim to the further longitudinal rim, thereby obtaining a longitudinal seam.

Preferably, the folding in process step b. is done along a linear indentation. A preferred linear indentation is a groove.

A contribution to the achievement of at least one of the objects of the invention is made by an embodiment 1 of a container precursor 2 obtainable by the process 2.

A contribution to the achievement of at least one of the objects of the invention is made by an embodiment 1 of a process 3 comprising, as process steps,
 A) providing the container precursor 1 or 2, in each case according to any of its embodiments;
 B) forming a base region of the container precursor by folding the sheetlike composite;
 C) closing the base region;
 D) filling the container precursor with a food or drink product, and
 E) closing the container precursor in a top region, thereby obtaining a closed container.

In an embodiment 2 according to the invention, the process 3 is configured according to its embodiment 1, wherein the process further comprises a process step of
 F) joining the closed container to an opening aid.

In an embodiment 3 according to the invention, the process 3 is configured according to its embodiment 1 or 2, wherein the process further comprises a process step of
 G) preserving the food or drink product in the closed container in a pressure chamber under a chamber pressure of greater than 1 bar at a temperature in a range from greater than 100 up to 140° C., preferably from greater than 100 to 130° C., more preferably from greater than 100 to 120° C., most preferably from greater than 100 to 110° C., in the presence of water vapour.

A contribution to the achievement of at least one of the objects of the invention is made by an embodiment 1 of a closed container 2 obtainable by the process 3 according to any of its embodiments 1 to 3.

A contribution to the achievement of at least one of the objects of the invention is made by an embodiment 1 of a use 1 of the sheetlike composite 1 or 2, in each case according to any of its embodiments above.

A contribution to the achievement of at least one of the objects of the invention is made by an embodiment 1 of a use 2 of a hardener, characterized by a ratio of a proportion of aromatic groups in the hardener to a proportion of aliphatic groups in the hardener in a range from 0.30 to 0.80, preferably from 0.33 to 0.77, more preferably from 0.35 to 0.75, most preferably from 0.37 to 0.73, in a printing ink for printing of a sheetlike composite precursor comprising, as mutually superposing layers of a layer sequence,
  i) a carrier layer, and
  ii) a barrier layer.

A contribution to the achievement of at least one of the objects of the invention is made by an embodiment 1 of a use 3 of a printing ink, characterized by a ratio of a proportion of aromatic groups in the printing ink to a proportion of aliphatic groups in the printing ink in a range from 0.30 to 0.80, preferably from 0.33 to 0.77, more preferably from 0.35 to 0.75, most preferably from 0.37 to 0.73, for printing of a sheetlike composite precursor comprising, as mutually superposing layers of a layer sequence,
  i) a carrier layer, and
  ii) a barrier layer.

Features described as preferred in one category of the invention are likewise preferred in an embodiment of the further categories of the invention.

Di- or Polyol

Useful di- or polyols include all di- or polyols that are known to the person skilled in the art for polyurethane formation and seem suitable for the process according to the invention. These are, for example, sugars such as isomalt, sorbitol or mannitol, aliphatic alcohols such as ethane-1,2-diol, propane-1,2-diol, propane-1,2,3-triol, pentaerythritol, polyester polyols or polyether polyols, especially polyethylene oxide (EO) or polypropylene oxide (PO), or at least two of these, particular preference being given to polyester polyols or polyether polyols or the combination thereof and further preference to polyether polyols.

Di- or Polyisocyanate

Useful di- or polyisocyanates include all of those that are known to the person skilled in the art for polyurethane formation and seem suitable for the process according to the invention. These are, for example, diphenylmethane diisocyanate (MDI), polymeric diphenylmethane diisocyanate (PMDI), tolylene diisocyanate (TDI), naphthylene diisocyanate (NDI), hexamethylene diisocyanate (HDI), isophorone diisocyanate (IPDI) or 4,4'-diisocyanatodicyclohexylmethane (H12MDI) or at least two of these.

Polyaddition Product

The first polymer layer preferably comprises a crosslinked first polymer. The first colour application preferably comprises a crosslinked second polymer. Each further colour application preferably comprises a crosslinked further polymer. A preferred crosslinked first polymer is a polyaddition product. In addition, a preferred crosslinked second polymer is a polyaddition product. A preferred crosslinked further polymer is likewise a polyaddition product. Here, the crosslinked first polymer, the crosslinked second polymer and the crosslinked further polymers in each case can be the same or different.

For the crosslinked first, crosslinked second and crosslinked further polymers, useful polyaddition products are all of those that are known to the person skilled in the art and seem suitable for the process according to the invention. By contrast with the chain polymers, the monomers of the polyaddition products are capable of reacting with one another to form di-, tri- or oligomers without requiring an initiator which, as in the case of free-radical polymerization, initiates a reaction of a monomer that then reacts successively with other monomers. The di-, tri- or oligomers that form at the start of the polyaddition are additionally capable of reacting with one another to form larger units. Typical polyaddition products are polyamides, polycarbonates, polyesters, polyphenylene oxides, polysulfones, polyepoxides or polyurethanes or a combination of at least two of these, particular preference being given to polyaddition products consisting of polyurethane to an extent of at least 50% by weight, preferably at least 70% by weight and more preferably at least 90% by weight, based in each case on the polyaddition product. It is further preferable that one layer selected from the group consisting of the first polymer layer, the second polymer layer and the further polymer layers or a combination of at least two of the above consist(s) of a polyaddition product to an extent of at least 50% by weight, preferably at least 70% by weight and more preferably at least 90% by weight, based in each case on the respective polymer layer. In general, the aforementioned polymer layers, however, do not comprise more than 99% by weight of the polyaddition product, in order still to be able to contain other substances such as colourants.

Colourant

Useful colourants include both solid and liquid colourants that are known to the person skilled in the art and are suitable for the present invention. According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). A pigment is a colourant that is preferably insoluble in the application medium. A dye is a colourant that is preferably soluble in the application medium. A preferred first colourant is a first pigment. A preferred first pigment is $TiO_2$. The second colourant and the further colourants are preferably each colourants of a chromatic colour. The first colourant is preferably a white colourant. Preferably, the chromatic colours are at least partly selected from the group consisting of red, green and blue. In another preferred embodiment, the chromatic colours are at least partly selected from the group consisting of cyan, magenta and yellow. Pigments suitable as a second and/or further colourant also include the following:

i. Red or magenta pigments:
   Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257;
   Pigment Violet 3, 19, 23, 29, 30, 37, 50 and 88;

ii. Blue or cyan pigments:
   Pigment Blue 1, 15, 15:1, 15:2, 15:3, 15:4, 15:6, 16, 17-1, 22, 27, 28, 29, 36 and 60;

iii. Green pigments:
   Pigment Green 7, 26, 36 and 50;

iv. Yellow pigments:
Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185 and 193.

In addition, pigments suitable as first colourant include the following white pigments: Pigment White 6, 18 and 21.

Area Coverage

The area coverages of the first polymer layer and of the colour applications may be less than 100%. Accordingly, the first polymer layer and the colour applications may take the form of noncontinuous layers. More preferably, the area coverage of the first polymer layer is 100%. In this case, the first polymer layer is a fully covering and hence continuous layer. Layers that overlay such a first polymer layer toward the outer face of the sheetlike composite preferably lie atop the first polymer layer which preferably serves as primer. The colour applications preferably have area coverages of less than 100%. In this case, these colour applications are each individually non-covering. Instead, the colour applications have clear regions, which means that they are noncontinuous. Thus, the colour applications also need not lie atop one another. Instead, the colour applications may each consist of a multitude of regions unconnected to one another. Thus, the regions of the further colour applications may be arranged alongside and/or partly atop the regions of the first colour application. Such an arrangement is especially the result of application of the first colour application precursor composition from which the first colour application is preferably obtained and of the further colour application precursor compositions from which the further colour applications are each preferably obtained by means of intaglio printing with area coverages of less than 100%. If there is a plurality of noncontinuous layers not lying one on top of another, but instead, as described above, lying in a plane of the layer sequence, the colour applications can preferably be easily distinguished from one another in that they comprise different colourants, preferably different colours.

Colour Application

An colour application comprises at least one colourant, preferably in a proportion in a range from 5 to 15% by weight, more preferably from 8 to 15% by weight, more preferably from 13 to 15% by weight, based in each case on the weight of the colour application. A preferred colour application consists of a multitude of, preferably printed, halftone dots. Preferably, the colour application forms a decoration or a colour portion of a decoration. A further preferred colour application further comprises an application medium, preferably in a proportion in a range from 1 to 20% by weight, more preferably from 5 to 15% by weight, based on the weight of the colour application. A preferred application medium is an organic medium. A preferred organic medium is an organic binder. A preferred organic binder is a thermoplastic. A preferred thermoplastic is polyvinyl acetal. The colour application preferably adjoins the first polymer layer, wherein the first polymer layer preferably adjoins the further polymer layer. The colour application is preferably obtainable by a printing process. Here, a preferred printing process is offset printing or intaglio printing or both, particularly preferably intaglio printing. A further preferred colour application is not overlaid by any further layer of the layer sequence on a side of the colour application that is facing away from the carrier layer.

Polyvinyl Acetal

Polyvinyl acetals are thermoplastics which are prepared by reaction of polyvinyl alcohol with aldehydes or ketones. According to the aldehyde used, for example formaldehyde, acetaldehyde or butyraldehyde, a distinction is made between various polyvinyl acetals. Preferred polyvinyl acetals are polyvinyl formal and polyvinyl butyral. A particularly preferred polyvinyl acetal is polyvinyl butyral (PVB).

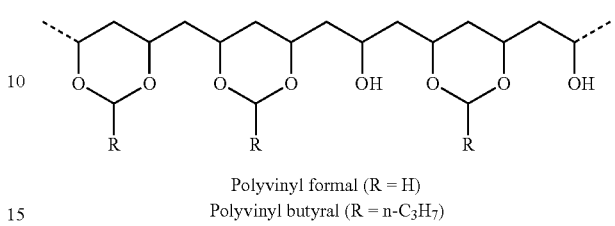

Polyvinyl formal (R = H)
Polyvinyl butyral (R = n-$C_3H_7$)

Liquid First Polymer Layer Precursor Composition/Liquid Colour Application Precursor Compositions In the process according to the invention, it is preferable that a precursor composition selected from the group consisting of the liquid first polymer layer precursor composition, the liquid first colour application precursor composition and the liquid further colour application precursor compositions or a combination of at least two of these, in the respective overlaying, has a temperature in the range from 25 to 40° C., preferably in the range from 26 to 32° C. and more preferably in the range from 27 to 29° C. This has an advantageous effect on autoclaving resistance.

In addition, in the process according to the invention, it is preferable that a precursor composition selected from the group consisting of the liquid first polymer layer precursor composition, the liquid first colour application precursor composition and the liquid further colour application precursor compositions or a combination of at least two of these, in the respective overlaying, has a viscosity in the range from 0.05 to 0.3 Pa·s and preferably in a range from 0.1 to 0.2 Pa·s. The viscosity is determined according to DIN 53019-1 by means of a rotary viscometer. The application of the compositions having such viscosities has an advantageous effect on autoclaving resistance.

In addition, the liquid first polymer layer precursor composition, the liquid first colour application precursor composition and/or the liquid further colour application precursor compositions may comprise additives. Suitable additives are all of those that are known to the person skilled in the art and are suitable for the process according to the invention. Preference is given to using waxes, soaps or surfactants and, for increasing the storability of the composition, stabilizers. Frequently, the additives have a melting point above 30° C. and preferably above 50° C. The additives can adjust the viscosity and the surface tension of the liquid compositions.

The respective overlaying of the carrier layer of the sheetlike composite precursor with the liquid first polymer layer precursor composition, the liquid first colour application precursor composition and/or the liquid further colour application precursor compositions can be effected, for example, by any printing process which seems suitable to the person skilled in the art. Printing processes especially include planographic printing, digital printing, relief printing and intaglio printing, preferably intaglio printing. In the process according to the invention, it is preferable that the respective liquid composition is applied to the sheetlike composite precursor by means of a printing form surface having a multitude of recesses that take up at least some of the respective liquid composition and preferably take the form of wells. The printing form surface is preferably on a roll that draws the liquid composition from a reservoir vessel. It is further preferable that very substantially homogeneous filling of the recesses is ensured by means of a homogenizer, preferably in the form of a squeegee. The resultant improvement in the uniformity of the layer produced has a positive effect on autoclaving resistance. Moreover, it is preferable in the process according to the invention that the surface of the sheetlike composite precursor that is to be printed is pressed onto the printing form surface by means of a pressing means, preferably a press roll, also called impression roll.

In the respective overlaying with the liquid first colour application precursor composition and/or the liquid further colour application precursor compositions, they each preferably comprise at least one polyvinyl acetal in a proportion in a range from 2 to 12% by weight, preferably from 3.5 to 11% by weight, more preferably from 5.1 to 10% by weight, based in each case on the weight of the liquid colour application precursor composition. In the respective overlaying with the liquid first colour application precursor composition and/or the liquid further colour application precursor compositions, they each preferably comprise at least one solvent in a proportion in a range from 60 to 95% by weight, preferably from 65 to 91% by weight, more preferably from 69 to 88% by weight, based in each case on the weight of the liquid colour application precursor composition.

Solvents

Solvents are considered to be substances having a melting point of less than 10° C. In principle, useful solvents are all of those known to the person skilled in the art and that are suitable for the process according to the invention. For the first polymer layer precursor composition in particular, polar solvents are preferred. Among these, aprotic and protic solvents are suitable. Among these, preference is given to aprotic polar solvents for the first polymer layer precursor composition, among which particular preference is given to esters and ketones, for example acetone. Useful esters include, in particular, ethyl acetate, n-propyl acetate or methoxypropyl acetate. For the colour application precursor compositions, ethanol is particularly preferred as solvent.

Layers of the Sheetlike Composite

The layers of the layer sequence have been joined to one another. Two layers have been joined to one another when their adhesion to one another extends beyond van der Waals attraction forces. Layers that have been joined to one another preferably belong to a category selected from the group consisting of sealed to one another, adhesively bonded to one another and compressed to one another, or a combination of at least two of these. Unless stated otherwise, in a layer sequence, the layers may follow one another indirectly, i.e. with one or at least two intermediate layers, or directly, i.e. with no intermediate layer. This is the case especially in the form of words in which one layer overlays another layer. A form of words in which a layer sequence comprises enumerated layers means that at least the layers specified are present in the sequence specified. This form of words does not necessarily mean that these layers follow on directly from one another. A form of words in which two layers adjoin one another means that these two layers follow on from one another directly and hence with no intermediate layer. However, this form of words does not specify whether or not the two layers have been joined to one another. Instead, these two layers may be in contact with one another.

Polymer Layers

The term "polymer layer" refers hereinafter especially to the inner polymer layer, the intermediate polymer layer and the further polymer layer. A preferred polymer is a polyolefin. The polymer layers may have further constituents. The polymer layers are preferably introduced into or applied to the sheetlike composite material in an extrusion process. The further constituents of the polymer layers are preferably constituents that do not adversely affect the behaviour of the polymer melt on application as a layer. The further constituents may, for example, be inorganic compounds, such as metal salts, or further plastics, such as further thermoplastics. However, it is also conceivable that the further constituents are fillers or pigments, for example carbon black or metal oxides. Suitable thermoplastics for the further constituents especially include those that are readily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene) and VLDPE (very low density polyethylene) and mixtures of at least two of these. It is also possible to use mixtures of at least two thermoplastics. Suitable polymer layers have a melt flow rate (MFR) in a range from 1 to 25 g/10 min, preferably in a range from 2 to 20 g/10 min and more preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and further preferably in a range from 0.900 g/cm$^3$ to 0.970 g/cm$^3$. The polymer layers preferably have at least one melting temperature in a range from 80 to 155° C., preferably in a range from 90 to 145° C. and more preferably in a range from 95 to 135° C.

Inner Polymer Layer

The inner polymer layer is based on thermoplastic polymers, where the inner polymer layer may include a particulate inorganic solid. However, it is preferable that the inner polymer layer comprises a thermoplastic polymer to an extent of at least 70% by weight, preferably at least 80% by weight and more preferably at least 95% by weight, based in each case on the total weight of the inner polymer layer. Preferably, the polymer or polymer mixture of the inner polymer layer has a density (according to ISO 1183-1:2004) in a range from 0.900 to 0.980 g/cm$^3$, more preferably in a range from 0.900 to 0.960 g/cm$^3$ and most preferably in a range from 0.900 to 0.940 g/cm$^3$. The polymer is preferably a polyolefin, mPolymer or a combination of the two.

Further Polymer Layer

The further polymer layer preferably comprises a polyethylene or a polypropylene or both. Here, preferred polyethylenes are LDPE and HDPE and mixtures of these. A preferred further polymer layer comprises an LDPE to an extent of at least 50% by weight, preferably to an extent of at least 60% by weight, more preferably to an extent of at least 70% by weight, still more preferably to an extent of at least 80% by weight, most preferably to an extent of at least 90% by weight, based in each case on the weight of the further polymer layer.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. Dimensionally stable containers of this kind should in principle be distinguished from pouches and bags, which are usually produced from thin films. As well as a number of plastics, preference is given to plant-based fibrous materials, especially pulps, preferably limed, bleached and/or unbleached pulps, with paper and cardboard being especially preferred. Accordingly, a preferred carrier layer comprises a multitude of fibres. The basis weight of the carrier layer is preferably in a range from 120 to 450 g/m², especially preferably in a range from 130 to 400 g/m² and most preferably in a range from 150 to 380 g/m². A preferred cardboard generally has a single-layer or multilayer structure and may have been coated on one or both sides with one or else more than one cover layer. Further, a preferred cardboard has a residual moisture content of less than 20% by weight, preferably of 2% to 15% by weight and especially preferably of 4% to 10% by weight, based on the total weight of the cardboard. An especially preferred cardboard has a multilayer structure. Further preferably, the cardboard has, on the surface facing the environment, at least one lamina, but more preferably at least two laminas, of a cover layer known to the person skilled in the art as a "paper coating". In addition, a preferred cardboard has a Scott bond value (according to Tappi T403 um) in a range from 100 to 360 J/m², preferably from 120 to 350 J/m² and especially preferably from 135 to 310 J/m². By virtue of the aforementioned ranges, it is possible to provide a composite from which it is possible to fold a container with high tightness, easily and in low tolerances.

The carrier layer is characterized by a bending resistance which can be measured with a bending tester according to ISO 2493-2:2011 at a bending angle of 15°. The bending tester used is a L&W Bending Tester code 160 from Lorentzen & Wettre, Sweden. The carrier layer preferably has a bending resistance in a first direction in the range from 80 to 550 mN. In the case of a carrier layer that comprises a multitude of fibres, the first direction is preferably a direction of orientation of the fibres. A carrier layer that comprises a multitude of fibres also preferably has a bending resistance in a second direction, perpendicular to the first direction, in a range from 20 to 300 mN. The samples used for measuring the bending resistance with the above measuring device have a width of 38 mm and a clamping length of 50 mm. A preferred sheetlike composite with the carrier layer has a bending resistance in the first direction in a range from 100 to 700 mN. Further preferably, the aforementioned sheetlike composite has a bending resistance in the second direction in a range from 50 to 500 mN. The samples of the sheetlike composite used for measuring with the above measuring device also have a width of 38 mm and a clamping length of 50 mm.

Barrier Layer

The barrier layer used may be any material which is suitable for a person skilled in the art for this purpose and which has sufficient barrier action, especially with respect to oxygen. The barrier layer is preferably selected from
 a. a plastic barrier layer;
 b. a metal layer;
 c. a metal oxide layer; or
 d. a combination of at least two of a. to c.

If the barrier layer, according to alternative a., is a plastic barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastics, especially thermoplastics, here include N- or O-bearing plastics, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the plastic barrier layer has a basis weight in a range from 2 to 120 g/m², preferably in a range from 3 to 60 g/m², especially preferably in a range from 4 to 40 g/m² and further preferably from 6 to 30 g/m². Further preferably, the plastic barrier layer is obtainable from melts, for example by extrusion, especially laminar extrusion. Further preferably, the plastic barrier layer may also be introduced into the sheetlike composite via lamination. It is preferable in this context that a film is incorporated into the sheetlike composite. In another embodiment, it is also possible to select plastic barrier layers obtainable by deposition from a solution or dispersion of plastics.

Suitable polymers preferably include those having a weight-average molecular weight, determined by gel permeation chromatography (GPC) by means of light scattering, in a range from $3 \cdot 10^3$ to $1 \cdot 10^7$ g/mol, preferably in a range from $5 \cdot 10^3$ to $1 \cdot 10^6$ g/mol and especially preferably in a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two of these, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm³, preferably in a range from 1.05 to 1.30 g/cm³ and especially preferably in a range from 1.08 to 1.25 g/cm³. It is further preferable that the PA has a viscosity number in a range from 130 to 250 ml/g and preferably in a range from 140 to 220 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all of the following properties:
 an ethylene content in a range from 20 to 60 mol %, preferably from 25 to 45 mol %;
 a density in a range from 1.0 to 1.4 g/cm³, preferably from 1.1 to 1.3 g/cm³;
 a melting point in a range from more than 155 to 235° C., preferably from 165 to 225° C.;
 an MFR value (210° C./2.16 kg when $T_{S(EVOH)}$<230° C.; 230° C./2.16 kg when 210° C.<$T_{S(EVOH)}$<230° C.) in a range from 1 to 25 g/10 min, preferably from 2 to 20 g/10 min;
 an oxygen permeation rate in a range from 0.05 to 3.2 cm³·20 μm/m²·day·atm, preferably in a range from 0.1 to 1 cm³·20 μm/m²·day·atm.

Preferably at least one polymer layer, further preferably the inner polymer layer, or preferably all polymer layers, has/have a melting temperature below the melting temperature of the barrier layer. This is especially true when the barrier layer is formed from polymer. The melting temperatures of the at least one polymer layer, especially the inner polymer layer, and the melting temperature of the barrier layer preferably differ here by at least 1 K, especially preferably by at least 10 K, still more preferably by at least 50 K, even more preferably by at least 100 K. The temperature difference should preferably be chosen to be only of such an amount that there is no melting of the barrier layer, especially no melting of the plastic barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 μm, preferably in a range from 3.5 to 12 μm and especially preferably in a range from 4 to 10 μm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a particular configuration, the metal layer consists of an aluminium foil. Suitable aluminium foils have a ductility of more than 1%, preferably of more than 1.3% and especially preferably of more than 1.5%, and a tensile strength of more than 30 N/mm$^2$, preferably more than 40 N/mm$^2$ and especially preferably more than 50 N/mm$^2$. Suitable aluminium foils exhibit in the pipette test a droplet size of more than 3 mm, preferably more than 4 mm and especially preferably of more than 5 mm. Suitable alloys for producing aluminium layers or foils are commercially available under the designations EN AW 1200, EN AW 8079 or EN AW 8111 from Hydro Aluminium Deutschland GmbH or Amcor Flexibles Singen GmbH. In the case of a metal foil as a barrier layer, it is possible to provide an adhesion promoter layer between the metal foil and a closest polymer layer on one and/or both sides of the metal foil.

Further preferably, the barrier layer selected, according to alternative c., may be a metal oxide layer. Useful metal oxide layers include all metal oxide layers that are familiar and seem suitable to the person skilled in the art for achieving a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a plastic layer, for example an oriented polypropylene film. A preferred process for this purpose is physical gas phase deposition.

In a further preferred embodiment, the metal layer or metal oxide layer may take the form of a layer composite composed of one or more plastic layers with a metal layer. Such a layer is obtainable, for example, by vapour deposition of metal on a plastic layer, for example an oriented polypropylene film. A preferred process for this purpose is physical gas phase deposition.

Adhesion/Adhesion Promoter Layer

An adhesion promoter layer may be present between layers which do not directly adjoin one another, preferably between the barrier layer and the inner polymer layer. Useful adhesion promoters in an adhesion promoter layer include all plastics which are suitable for producing a firm bond through functionalization by means of suitable functional groups, through the forming of ionic bonds or covalent bonds with a surface of a respective adjacent layer. Preferably, these are functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or the Escor®6000ExCo trade name by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as the carrier layer.

Polyolefin

A preferred polyolefin is a polyethylene (PE) or a polypropylene (PP) or both. A preferred polyethylene is one selected from the group consisting of an LDPE, an LLDPE, and an HDPE, or a combination of at least two of these. A further preferred polyolefin is an mPolyolefin (polyolefin prepared by means of a metallocene catalyst). Suitable polyethylenes have a melt flow rate (MFR=MFI–melt flow index) in a range from 1 to 25 g/10 min, preferably in a range from 2 to 20 g/10 min and especially preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

mPolymer

An mPolymer is a polymer which has been prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two of these.

Extrusion

In the extrusion, the polymers are typically heated to temperatures of 210 to 350° C., measured at the molten polymer film beneath the exit from the extruder die. The extrusion can be effected by means of extrusion tools which are known to those skilled in the art and are commercially available, for example extruders, extruder screws, feed block, etc. At the end of the extruder, there is preferably an opening through which the polymer melt is pressed. The opening may have any shape that allows extrusion of the polymer melt. For example, the opening may be angular, oval or round. The opening is preferably in the form of a slot of a funnel. Once the melt layer has been applied to the substrate layer by means of the above-described process, the melt layer is left to cool down for the purpose of heat-setting, this cooling preferably being effected by quenching via contact with a surface which is kept at a temperature in a range from 5 to 50° C., especially preferably in a range from 10 to 30° C. Subsequently, at least the flanks are separated off from the surface. The separation may be carried out in any way that is familiar and appears suitable to a person skilled in the art for separating the flanks quickly, as precisely as possible and cleanly. Preferably, the separation is effected by means of a knife, laser beam or waterjet, or a combination of two or more thereof, the use of knives being especially preferable, especially a wheel cup knife Folding of the Sheetlike Composite The folding of the sheetlike composite is preferably performed in a temperature range from 10 to 50° C., preferably in a range from 15 to 45° C. and especially preferably in a range from 20 to 40° C. This can be achieved by the sheetlike composite being at a temperature in the aforementioned ranges. It is also preferred that a folding tool, preferably together with the sheetlike composite, is at a temperature in the aforementioned ranges. For this purpose, the folding tool preferably does not have a heating means. Rather, the folding tool or else the sheetlike composite or both may be cooled. It is also preferred that the folding is performed at a temperature of at most 50° C., as "cold folding", and the joining takes place at over 50° C., preferably over 80° C. and especially preferably over 120° C., as "hot sealing". The aforementioned conditions, and especially temperatures, preferably also apply in the environment of the folding, for example in the housing of the folding tool.

"Folding" is understood here as meaning, according to the invention, an operation in which an elongated crease, forming an angle, is made in the folded sheetlike composite, preferably by means of a folding edge of a folding tool. For this purpose, often two adjoining faces of a sheetlike composite are bent increasingly towards one another. The folding produces at least two adjoining fold faces that can then be joined at least in sub-regions to form a container region. According to the invention, the joining can be performed by any measure which appears suitable to the person skilled in the art and which allows joining that is as gas- and liquid-tight as possible. The joining can be performed by sealing or adhesive bonding or a combination of the two measures. In the case of sealing, the join is created by means of a liquid and the solidification thereof. In the case of adhesive bonding, chemical bonds form between the interfaces or surfaces of the two articles to be joined and create the join. It is often advantageous in the case of sealing or adhesive bonding to press together the faces that are to be sealed or adhesively bonded.

Food or Drink Product

In the context of the invention, the sheetlike composite and the container precursor are preferably designed for production of a food or drink product container. In addition, the closed container according to the invention is preferably a food or drink product container. Food and drink products include all kinds of food and drink known to those skilled in the art for human consumption and also animal feeds. Preferred food and drink products are liquid above 5° C., for example milk products, soups, sauces, non-carbonated drinks Container Precursor A container precursor is a precursor of the closed container which arises in the course of production of a closed container. In this context, the container precursor comprises the sheetlike composite in the form of a blank. In this context, the sheetlike composite may be in an unfolded or folded state. A preferred container precursor has been cut to size and is designed for production of a single closed container. A preferred container precursor which has been cut to size and is designed for production of a single closed container is also referred to as a shell or sleeve. In this context, the shell or sleeve comprises the sheetlike composite in folded form. In addition, the container precursor preferably takes the form of an outer shell of a prism. A preferred prism is a cuboid. Moreover, the shell or sleeve comprises a longitudinal seam and is open in a top region and a base region. A typical container precursor which has been cut to size and is designed for production of a multitude of closed containers is often referred to as a tube.

A further preferred container precursor is open, preferably in a top region or a base region, more preferably in both. A preferred container precursor is in the form of a shell or tube or both. A further preferred container precursor comprises the printed sheetlike composite in such a way that the printed sheetlike composite has been folded at least once, preferably at least twice, more preferably at least 3 times, most preferably at least 4 times. A preferred container precursor is in one-piece form. More preferably, a base region of the container precursor is in a one-piece design with a lateral region of the container precursor.

Container

The closed container according to the invention may have a multitude of different forms, but preference is given to an essentially cuboidal structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used especially in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from a polymer or mixture of polymers and be attached on the outer face of the container. It is also conceivable that this device has been integrated into the container by direct injection moulding. In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include the longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product. Preferably, the closed container does not comprise any lid or base, or either, that has not been formed in one piece with the sheetlike composite. A preferred closed container comprises a food or drink product.

Hole

The at least one hole that is provided in the carrier layer according to preferred embodiments may have any shape that is known to a person skilled in the art and suitable for various closures or drinking straws. The holes often have rounded portions in plan view. Thus, the holes may be essentially circular, oval, elliptical or drop-shaped. The shape of the at least one hole in the carrier layer usually also predetermines the shape of the opening that is produced either by an openable closure which is connected to the container and through which the content of the container is dispensed from the container after opening, or by a drinking straw in the container. Consequently, the openings of the opened container often have shapes that are comparable to or even the same as the at least one hole in the carrier layer. Configurations of the sheetlike composite with a single hole primarily serve for letting out the food or drink product located in the container that is produced from the sheetlike composite. A further hole may be provided, especially for letting air into the container while the food or drink product is being let out.

In the context of covering the at least one hole of the carrier layer, it is preferred that the hole-covering layers are at least partly joined to one another, preferably to an extent of at least 30%, preferably at least 70% and especially preferably at least 90%, of the area formed by the at least one hole. It is also preferred that the hole-covering layers are joined to one another at the edges of the at least one hole and preferably lie against the edges in a joined manner, in order in this way to achieve an improved leak-tightness over a join that extends across the entire area of the hole. The hole-covering layers are often joined to one another over the region that is formed by the at least one hole in the carrier layer. This leads to a good leak-tightness of the container formed from the composite, and consequently to a desired long shelf life of the food or drink products kept in the container.

Opening/Opening Aid

The opening of the container is usually brought about by at least partially destroying the hole-covering layers that cover the at least one hole. This destruction can be effected by cutting, pressing into the container or pulling out of the container. The destruction can be effected by means of an opening aid which is connected to the container and is arranged in the region of the at least one hole, usually above the at least one hole, for example also by a drinking straw which is pushed through the hole-covering layers. It is also preferred in a configuration according to the invention that an opening aid is provided in the region of the at least one hole. It is preferred here that the opening aid is provided on the surface area of the composite that represents the outer face of the container. The container also preferably comprises a closure, for example a lid, on the outer face of the container. It is in this case preferred that the closure covers the hole at least partially, preferably completely. Consequently, the closure protects the hole-covering layers, which are less robust in comparison with the regions outside the at least one hole, from damaging mechanical effects. For opening the hole-covering layers that cover the at least one hole, the closure often comprises the opening aid. Suitable as such an opening aid are for example hooks for tearing out at least part of the hole-covering layers, edges or cutting edges for cutting into the hole-covering layers or spikes for puncturing the hole-covering layers, or a combination of at least two of these. These opening aids are often mechanically coupled to a screw lid or a cap of the closure, for example by way of a hinge, so that the opening aids act on the hole-covering layers to open the closed container when the screw lid or the cap is actuated. Closure systems of this kind, comprising composite layers covering a hole, openable closures that cover this hole and have opening aids, are sometimes referred to in the specialist literature as "overcoated holes" with "applied fitments".

Test Methods

The following test methods were used within the context of the invention. Unless stated otherwise, the measurements were conducted at an ambient temperature of 23° C., an ambient air pressure of 100 kPa (0.986 atm) and a relative air humidity of 50%.

MFR

MFR is measured according to standard ISO 1133 (unless stated otherwise at 190° C. and 2.16 kg).

Density

Density is measured according to standard ISO 1183-1.

Melting Temperature

Melting temperature is determined on the basis of the DSC method ISO 11357-1, -5. The instrument is calibrated according to the manufacturer's instructions on the basis of the following measurements:

temperature indium—onset temperature,
heat of fusion indium,
temperature zinc—onset temperature.

Oxygen Permeation Rate

Oxygen permeation rate is determined according to standard ISO 14663-2 Appendix C at 20° C. and 65% relative air humidity.

Viscosity Number of PA

The viscosity number of PA is measured according to the standard DIN EN ISO 307 (2013-08) in 95% sulfuric acid.

Molecular Weight Distribution

The molecular weight distribution is measured by gel permeation chromatography by means of light scattering: ISO 16014-3/-5 (2009-09).

Moisture Content of Cardboard

The moisture content of the cardboard is measured according to the standard ISO 287:2009.

Adhesion

The adhesion of two adjacent layers is determined by fixing them in a 90° peel test instrument, for example the Instron "German rotating wheel fixture", on a rotatable roller which rotates at 40 mm/min during the measurement. The samples had been cut beforehand into strips 15 mm wide. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Colour Value (L* Value)

The measuring instrument used was a spectrophotometer with densitometer function—SpectroEye™ from X-Rite, 8105 Regensdorf, Switzerland. To conduct the measurement of colour value, a specimen of dimensions 3 cm×10 cm is cut out of the laminate and analysed with the measuring instrument according to the operating instructions supplied by the manufacturer.

Area Coverage

The area coverage is a measure of the extent to which a colour surface appears to be covered to a normal observer. The area coverage can be calculated by the Murray-Davies formula. All area coverage values in this document were measured with the aid of a spectrophotometer (Spectro-Eye™) from X-Rite (CH-8105 Regensdorf).

Surface Tension

For determination of the surface tension of a polymer layer or an outer face, first of all, the contact angle for wetting with water ("water contact angle") is determined according to the standard ATSM D5946-09. In this case, samples of dimensions 30 mm×35 mm are cut out of the laminate with a scalpel. 10 measurements are conducted on each sample, from which the mean is calculated. Prior to the measurement, the samples are prepared according to section 10.2 of the standard. The test conditions are chosen according to section 10.4. Proceeding from the measured contact angle for water, the surface tension in dyn/cm (dyn/cm=mN/m) is read off from table X2.1 of Annex X2 of the standard.

Bond Strength of Outer Layers

The bond strength of an ink layer is understood to mean the resistance of the ink layer to forces that occur when an adhesive strip is torn off a surface of the ink layer. The adhesive strip used in the test is Tesaband 4104 adhesive tape, width 20 mm, from the manufacturer Beiersdorf AG, Hamburg. The laminate to be tested is placed with the ink layer upward on a hard, smooth and flat base. For each test run, a strip of the Tesaband 4104 adhesive tape is stuck onto the ink layer at least over a length of 30 mm and pressed on homogeneously by thumb. The test is effected within 30 seconds after the Tesafilm adhesive tape has been stuck on. Longer residence times on the ink layer can lead to different results. The test is effected either in that
 a. the adhesive strip is pulled off sharply at an angle of 90°, or
 b. the adhesive strip is pulled off by gradual peeling (at an angle of less than 45° relative to the ink layer).

For each of the two test methods a. and b., 3 test runs are conducted at different sites of the ink layer. The results are assessed by the naked eye using the scale below.

The results improve from 1 to 5:
 5—ink layer not pulled off
 4—spots of ink layer pulled off at individual sites
 3—distinct areas of ink layer pulled off at individual sites
 2—ink layer pulled off over large areas
 1—ink layer pulled off completely, based on the area of the adhesive strip The 6 results are used to form the mean, which corresponds to the end result of the measurement.

Stability to Elevated Temperature and Humidity

The laminates to be tested are subjected to moisture and heat in a water bath at a temperature of 94° C. for 60 seconds. The water bath is within a beaker and is constantly stirred with a magnetic stirrer in order to assure a homogeneous temperature distribution. The temperature is checked with a thermometer and the time is measured with a stopwatch. After the 60 seconds, the laminate remains in the water bath, where the ink layer is rubbed with a glass rod having rounded edges under gentle pressure. Subsequently, the laminate is removed from the water bath and the ink layer is checked for damage by the naked eye. For this purpose, 3 test runs in each case are conducted at different sites of the ink layer. In this study, it should always be ensured that the duration of the rubbing treatment with a glass rod and the pressure exerted are about the same for all samples. For this purpose, the tests in a comparative test series should always be conducted by the same person.

The assessment is made according to the following scale, the result improving from 1 to 5:
 1—the ink layer can be scratched off completely
 2—the ink layer is significantly damaged
 3—the ink layer is less severely but distinctly damaged
 4—the ink layer is only slightly damaged
 5—the ink layer is undamaged The 3 results are used to form the mean, which corresponds to the end result of the measurement.

Proportions of Aliphatic Groups, Aromatic Groups and Carbonyl Groups

The proportions of aliphatic groups, aromatic groups and carbonyl groups in a layer or composition are determined by means of ATR infrared spectroscopy. For this purpose, the layer or composition is analysed with an FT-IR microscope—Thermo Scientific Nicolet™ iN™ 10 MX Infrared Imaging Microscope from Thermo Fisher Scientific Inc. An ATR spectrum of the sample to be analysed that covers the wave number range from 3500 to 1400 $cm^{-1}$ with a resolution of 4 $cm^{-1}$ is recorded at 45° by means of a diamond as detector tip. The spectrum measured comprises a first maximum of the absorption/extinction measured in the wave number range from 2900 to 2950 $cm^{-1}$. This first maximum is caused by the vibration of C—$H_2$ groups (aliphatic groups). Furthermore, the spectrum comprises a second maximum in the wave number range from 1720 to 1740 $cm^{-1}$. This second maximum corresponds to the C=O vibration (carbonyl groups). In addition, the spectrum comprises a third maximum in the wave number range from 1590 to 1610 $cm^{-1}$. This third maximum corresponds to the C=C vibration (aromatic groups). The areas of the vibration maxima present are determined by integration by means of the microscope software (Thermo Scientific OMNIC™ Series Software, Version 8.2 from Thermo Fisher Scientific Inc.). The area under the maximum for a particular group herein is the proportion of the respective group in the sample analysed. The respective ratios of these proportions are determined by quotient formation.

The invention is described in more detail hereinafter by examples and drawings, although the examples and drawings do not imply any restriction of the invention. Also, unless otherwise indicated, the drawings are not to scale.

Laminate Construction

For the examples (inventive) and comparative examples (noninventive), unprinted laminates with the layer structure and layer sequence which follows were prepared by a layer extrusion method.

TABLE 1

General construction of the unprinted example and comparative example laminates

| Layer designation | Material | Basis weight [g/m²] |
|---|---|---|
| Outer polymer layer | PP Daploy SF313HMS, Borealis, Vienna | 30 |
| Carrier layer | Cardboard: Stora Enso Natura T Duplex twice-coated, Scott bond 200 J/m², residual moisture content 7.5% | 210 |
| Intermediate polymer layer | PP Daploy SF313HMS, Borealis, Vienna | 20 |
| Barrier layer | Aluminium foil, EN AW 8079 from Hydro Aluminium Deutschland GmbH | here: thickness 9 µm |
| Adhesion promoter layer | Admer; Mitsui; Japan | 6 |
| Inner polymer layer | PP Daploy SF313HMS, Borealis, Vienna | 30 |

Laminate Production

The laminate is produced with an extrusion coating system from Davis Standard. Here, the extrusion temperature is in a range from about 280 to 330° C. Deviations in the temperatures of ±6° C. are within the normal tolerance. Deviations in the basis weights of ±3 g/m² are within the normal tolerance. In the first step, the carrier layer, according to the container to be produced, is provided with a hole and then the outer polymer layer is applied to the carrier layer. In the second step, the barrier layer is applied together with the intermediate polymer layer to the carrier layer that has been coated with the outer polymer layer beforehand. Subsequently, the adhesion promoter layer and the inner polymer layer are co-extruded onto the barrier layer. For application of the individual layers, the polymers are melted in an extruder. In the case of application of a polymer in a layer, the resultant melt is transferred via a feed block into a nozzle and extruded onto the carrier layer.

Printing

The laminates as described above were subsequently printed in an intaglio printing method. First of all, the outer polymer layer was subjected to a corona treatment with an AVE-250E instrument from AFS Entwicklungs- and Vertriebs GmbH, Germany. The input power and the voltage of the corona treatment were chosen so as to obtain a surface tension of the outer polymer layer of 42 dyn/cm directly after the corona treatment. The corona treatment was followed immediately by the printing onto the treated outer polymer layer in multiple steps, and the printing was conducted in each case in the form of intaglio printing with a printing system from Kochsiek, Germany. A liquid white primer was printed onto the treated outer polymer layer over the full area (area coverage of about 100%). The liquid primers each contain, in the in examples and comparative examples, Desmodur N100 and Desmodur L75H from Covestro, Germany; PV 86 Weiss from Siegwerk Druckfarben AG, Siegburg, Germany; and ethyl acetate as solvent. These components were mixed with one another in ratios so as to achieve the ratios specified in Table 2 in the liquid primer. The latter ratios were determined by IR spectroscopy according to the test method specified above. The respective liquid primer was hardened by blowing with a fan for 10 min. Unless stated otherwise below, the hardening was effected at a temperature of 23° C. Furthermore, the hardened primers were examined according to the above-specified test method using IR spectroscopy for the ratios of aromatic groups to carbonyl groups, aliphatic groups to carbonyl groups, and aromatic groups to aliphatic groups. The results of these measurements are summarized in Table 3 below. Subsequently, a liquid chromatic ink of the VB67 type from Siegwerk Druckfarben AG, Siegburg, Germany with ethanol as solvent, in a further intaglio printing method, was printed onto the hardened primer in an area coverage of 70% and then likewise hardened/dried by blowing with a fan for 10 min. The outer faces with the chromatic ink layers of the printed laminates thus obtained were examined according to the above-described test methods for their bond strength and for stability at elevated temperature and humidity. The results are shown in Table 4.

TABLE 2

Ratios of proportions of chemical groups in the liquid primers printed according to the examples and comparative examples

| | aromatic groups/aliphatic groups in liquid primer |
|---|---|
| Comparative example 1 | 0.84 |
| Example 1 | 0.63 |
| Example 2 | 0.53 |
| Example 3 | 0.30 |
| Comparative example 2 | 0.27 |

Container Production

Grooves, especially longitudinal grooves, were introduced into the printed laminates obtained as described above. In addition, the grooved laminate was divided into blanks for individual containers, each blank including one of the above holes. By folding along the 4 longitudinal grooves of each and every blank and sealing of overlapping fold faces, a container precursor shell of the shape shown in FIG. 3 was obtained in each case. This shell was used to produce a closed container of the shape (brick type) shown in FIG. 4 in a CFA 712 standard filling machine, SIG Combibloc, Linnich. This involved producing a base region by folding and sealing by heat-sealing. This gave rise to a beaker that was open at the top. The beaker was sterilized with hydrogen peroxide. In addition, the beaker was filled with water. By folding and ultrasound sealing, the top region of the beaker having the hole was closed and hence a closed container was obtained. An opening aid was secured on this container in the region of the hole. The containers thus obtained were autoclaved in a rotary autoclave in a moist steam atmosphere. The autoclaving comprised a heating phase for 13 min, a hold time at 125° C. for 42 min and a cooling phase for 25 min. The chamber pressure was 2.6 bar and the rotation was at 3 revolutions/min. Subsequently, the autoclaved containers were examined for damage to the chromatic ink layer by the naked eye, in order to determine the autoclavability thereof. Evaluation was effected according to the scale which follows. The test results in this regard are reported in Table 4.

++: no damage to the ink layer visible by eye

+: slight, barely visible damage to the ink layer

−: significant damage to the ink layer visible by eye

Evaluation

The results of the studies conducted in the examples and comparative examples are summarized in the tables which follow.

TABLE 3

Ratios of proportions of chemical groups in the hardened primers of the example and comparative example laminates

| | aromatic groups/<br>carbonyl groups | aliphatic groups/<br>carbonyl groups |
|---|---|---|
| Comparative example 1 | 0.36 | 0.38 |
| Example 1 | 0.30 | 0.43 |
| Example 2 | 0.26 | 0.45 |
| Example 3 | 0.22 | 0.48 |
| Comparative example 2 | 0.16 | 0.65 |

TABLE 4

Evaluation of the examples and comparative examples with regard to bond strength, stability at elevated temperature and humidity and autoclavability, in each case in the hardened chromatic ink applications

| | Bond strength of the chromatic ink layer | Stability of the chromatic ink layer at elevated temperature and humidity | Autoclave stability of the chromatic ink layer |
|---|---|---|---|
| Comparative example 1 | 3 | 1 | − |
| Example 1 | 4 | 4 | + |
| Example 2 | 5 | 5 | ++ |
| Example 3 | 4 | 4 | + |
| Comparative example 2 | 1 | 3 | + |

Examples 4 to 8 detailed hereinafter were conducted like the above Example 3. More particularly, the same primer and the same chromatic ink were used. However, a difference was that the liquid primers printed on were hardened by blowing with a fan at the temperatures specified in Table 5.

TABLE 5

Drying temperatures of the primer in further inventive examples

| | Hardening of the primer at temperature [° C.] |
|---|---|
| Example 4 | 23 |
| Example 5 | 30 |
| Example 6 | 35 |
| Example 7 | 40 |
| Example 8 | 50 |

TABLE 6

Process properties of the printing processes conducted for the application of the primer and the chromatic ink layer in the further examples

| | Energy consumption in the printing process | Processing properties of the laminate printed with the primer | Maximum laminate speed in the printing process [m/min] |
|---|---|---|---|
| Example 4 | ++ | ++ | 400 |
| Example 5 | + | ++ | 380 |
| Example 6 | o | ++ | 300 |
| Example 7 | − | + | 220 |
| Example 8 | −− | − | 150 |

In Table 6 above, the symbols have the following meanings for the energy consumption in the printing process: ++ lower energy consumption than +, + lower energy consumption than o, o lower energy consumption than −, − lower energy consumption than −−.

The processing properties of the laminate printed with the primer that are reported in Table 6 are determined via the deposition characteristics. The deposition characteristics describe the unintentional buildup of primer material on the deflecting rolls of the printing machine. "++" means that no such buildup is observed. A "+" indicates buildup of primer material on the deflecting rolls of the printing machine that still enables faultless production without cleaning of the deflecting rolls. A "−" indicates buildup of primer material on the deflecting rolls of the printing machine that does not enable faultless production without cleaning of the deflecting rolls.

The figures show, in schematic form and not to scale, unless stated otherwise in the description or the respective figure:

FIG. 1a schematic diagram of a section of a sheetlike composite according to the invention in cross section;

FIG. 2a schematic diagram of a section of a further sheetlike composite according to the invention in cross section;

FIG. 3a schematic diagram of a container precursor according to the invention;

FIG. 4a schematic diagram of a closed container according to the invention;

FIG. 5a flow diagram of a process according to the invention for printing a sheetlike composite precursor;

FIG. 6a flow diagram of a further process according to the invention for printing a sheetlike composite precursor;

FIG. 7a flow diagram of a process according to the invention for producing a container precursor;

FIG. 8a flow diagram of a process according to the invention for producing a closed container; and FIG. 9a schematic diagram of a first printing form.

FIG. 1 shows a schematic diagram of a section of a sheetlike composite 100 according to the invention in cross section. The sheetlike composite 100 consists of the following layers of a layer sequence in the direction from an outer face 101 of the sheetlike composite 100 to an inner face 102 of the sheetlike composite 100: a first polymer layer 103, a carrier layer 104, an intermediate polymer layer 105 and a barrier layer 106. Here, the carrier layer 104 consists of a Stora Enso Natura T Duplex twice-coated cardboard (Scott bond 200 J/m², residual moisture content 7.5%, basis weight 210 g/m²). The intermediate polymer layer 105 consists of LDPE 19N430 from Ineos GmbH, Cologne (basis weight 18 g/m²). The barrier layer 106 consists of an EN AW 8079 aluminium foil from Hydro Aluminium Deutschland GmbH (thickness 6 μm). Moreover, the first polymer layer 103 comprises aromatic groups, aliphatic groups and carbonyl groups. A ratio of a proportion of the aromatic groups to a proportion of the carbonyl groups, in each case in the first polymer layer 103, is 0.25. A ratio of a proportion of the aliphatic groups to the proportion of the carbonyl groups, in each case in the first polymer layer 103, is 0.45. A ratio of the proportion of the aromatic groups to the proportion of the aliphatic groups is 0.53. The first polymer layer 103 here comprises a polyurethane having the aromatic and aliphatic groups. The polyurethane was obtained by a polyaddition of an aromatic polyisocyanate based on tolylene diisocyanate and an aliphatic polyisocyanate based on hexamethylene diisocyanate (HDI of the biuret type) with trimethylolpropane and a polyester containing OH groups from adipic acid. In addition, the first polymer layer 103 comprises 30.9% by weight of $TiO_2$ (rutile type), based on the weight of the first polymer layer 103. Moreover, the first polymer layer 103 comprises $SiO_2$, polyvinyl chloride, cellulose acetate butyrate, polyadipate and polyolefin wax. In addition, the first polymer layer 103 is characterized by an L* value in the L*a*b* colour system of 89.6.

Figure 2:
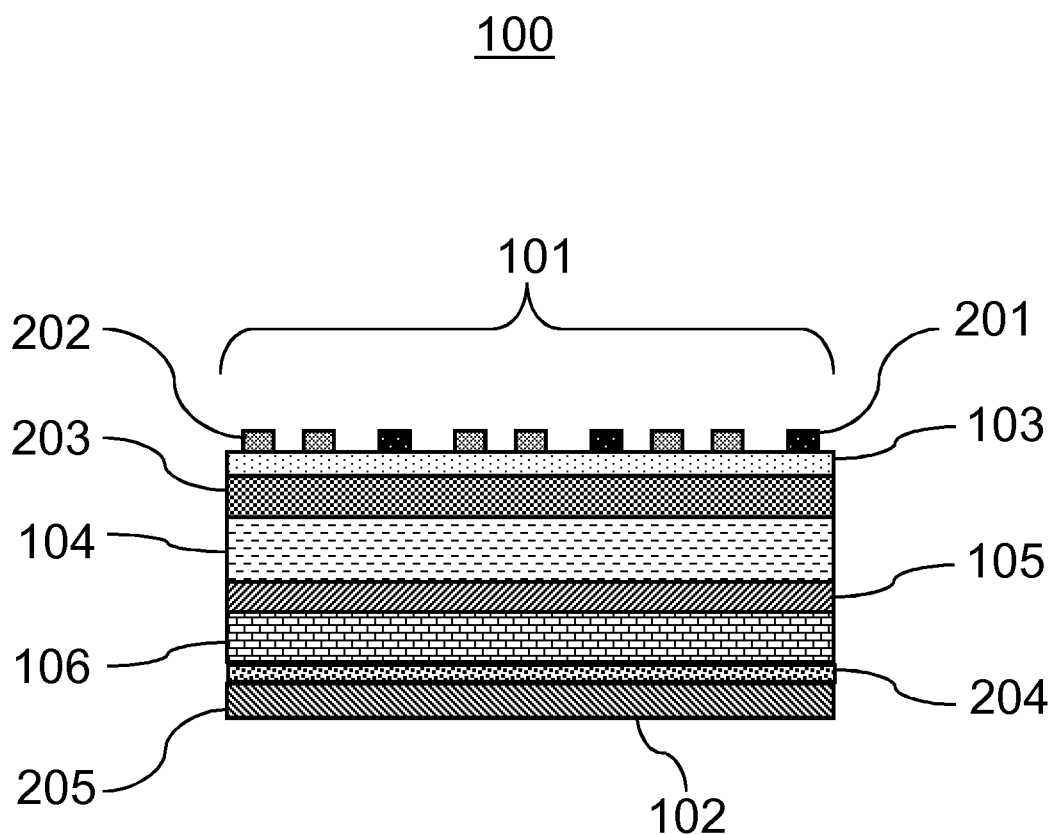

FIG. 2 shows a schematic diagram of a section of a further sheetlike composite 100 according to the invention in cross section. The sheetlike composite 100 consists of the following layers of a layer sequence in the direction from an outer face 101 of the sheetlike composite 100 to an inner face 102 of the sheetlike composite 100: a first polymer layer 103, a further polymer layer 203 of LDPE 19N430 from Ineos GmbH, Cologne (basis weight 15 g/m$^2$); a carrier layer 104 of a Stora Enso Natura T Duplex twice-coated cardboard (Scott bond 200 J/m$^2$, residual moisture content 7.5%, basis weight 210 g/m$^2$); an intermediate polymer layer 105 of LDPE 19N430 from Ineos GmbH, Cologne (basis weight 18 g/m$^2$); a barrier layer 106 of an EN AW 8079 aluminium foil from Hydro Aluminium Deutschland GmbH (thickness 6 μm); an adhesion promoter layer 204 of Escor 6000 HSC from Exxon Mobil Corporation (basis weight 4 g/m$^2$) and LDPE 19N430 from Ineos GmbH, Cologne (basis weight 22 g/m$^2$); and an inner polymer layer 205 composed of a blend of 65% by weight of LDPE 19N430 from Ineos Köln GmbH and 35% by weight of Eltex 1315 AZ from Ineos Köln GmbH (blend basis weight 10 g/m$^2$). Here, the details relating to the first polymer layer 103 in FIG. 1 also apply to the first polymer layer 103 in FIG. 2. In addition, the first polymer layer 103 has an area coverage of 100%, based on a surface of the carrier layer 104 adjoining the first polymer layer 103. Furthermore, the first polymer layer 103 is overlaid by a first colour application 201 on a side of the first polymer layer 103 that is facing away from the carrier layer 104. The first colour application 201 comprises, to an extent of 9.3% by weight, based on the weight of the first colour application 201, a Pigment Yellow PY 13 and also 9% by weight of PVB, based on the weight of the first colour application 201, as binder, and a polyurethane. In addition, the first colour application 201 has an area coverage of 20%, based on the surface of the carrier layer 104 adjoining the first polymer layer 103. A further colour application 202 similarly overlays the first polymer layer 103 on the side of the first polymer layer 103 that is facing away from the carrier layer 104. The further colour application 202 comprises, to an extent of 13.5% by weight, based on the weight of the further colour application 202, a Pigment Blue PB15:3 and also 6% by weight of PVB, based on the weight of the further colour application 202, as binder, and a polyurethane. In addition, the further colour application 202 has an area coverage of 10%, based on the surface of the carrier layer 104 adjoining the first polymer layer 103. The first colour application 201 and the further colour application 202 each consist of a multitude of printed halftone dots. Here, the first colour application 201 and the further colour application 202 form a colour decoration of the sheetlike composite 100. The first polymer layer 103 forms a white primer for the colour decoration. The first colour application 201, the further colour application 202 and the first polymer layer 103 have all been obtained by intaglio printing.

Figure 3:
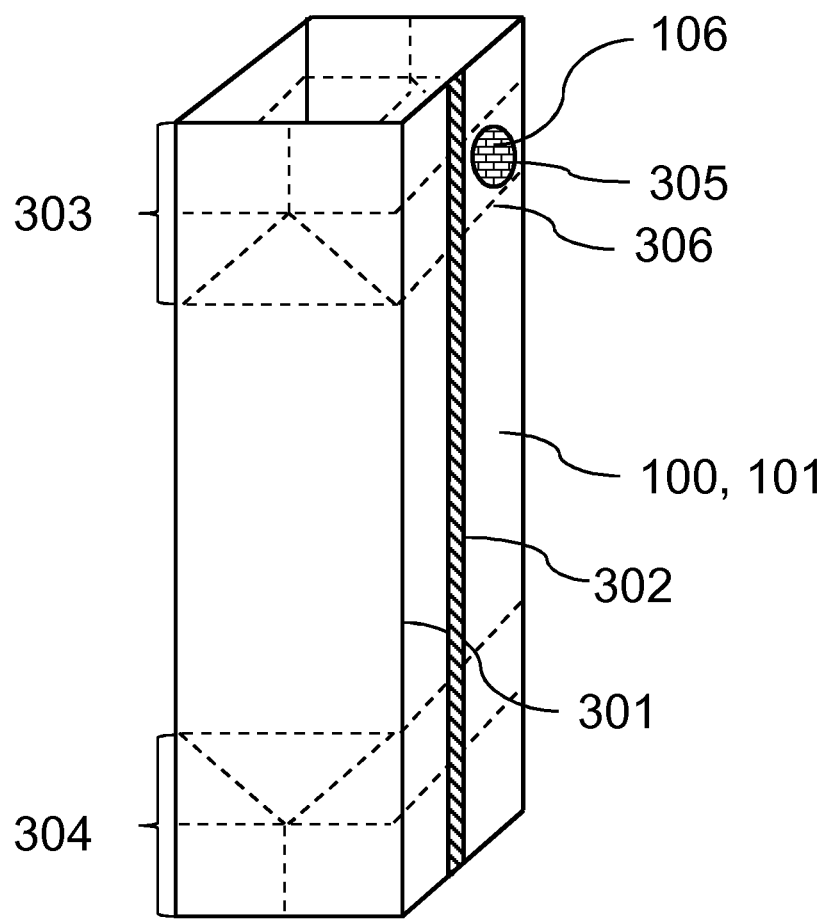

FIG. 3 shows a schematic diagram of a container precursor 300 according to the invention. The container precursor 300 comprises the sheetlike composite 100 of FIG. 2 with 4 longitudinal folds, each of which forms an edge (longitudinal edge) 301. The sheetlike composite 100 is a blank for production of a single closed container 400. The container precursor 300 is in the form of a shell and comprises a longitudinal seam 302 in which a first longitudinal rim and a further longitudinal rim of the sheetlike composite 100 are sealed to one another. In addition, the container precursor 300 comprises a hole 305 in the carrier layer 104. The hole 305 is covered by the further polymer layer 203 (not shown), the intermediate polymer layer 105 (not shown), the barrier layer 106, the adhesion promoter layer 204 (not shown) and the inner polymer layer 205 (not shown) as hole-covering layers. By folding along grooves 306 and joining of fold regions in a top region 303 and a base region 304 of the container precursor 300, a closed container 400 is obtainable. Such a closed container 400 is shown in FIG. 4.

Figure 4:
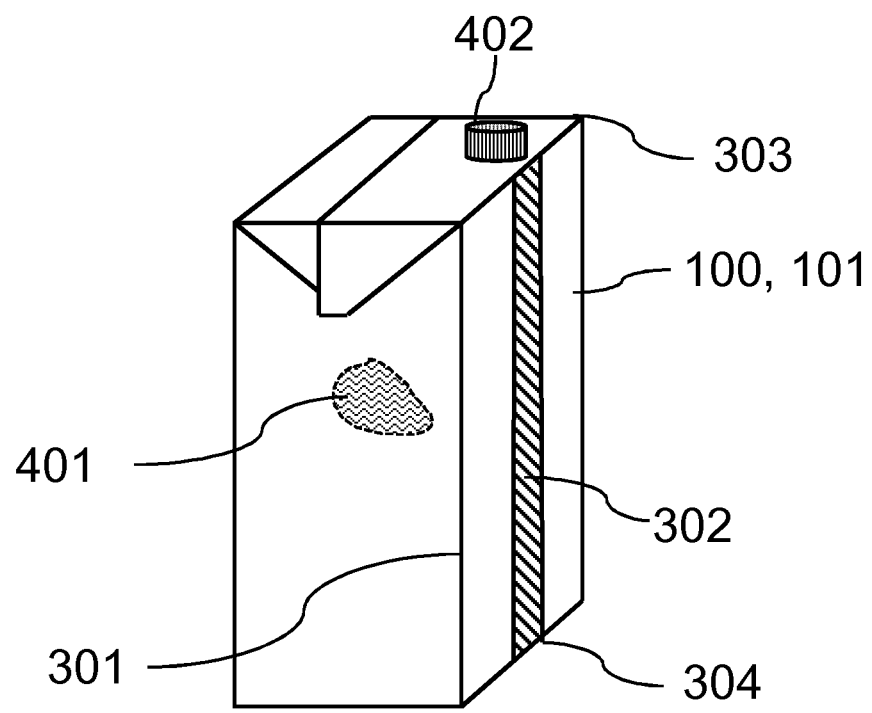

FIG. 4 shows a schematic diagram of a closed container 400 according to the invention. The closed container 400 has been produced from the container precursor 300 according to FIG. 3. The closed container 400 comprises a food or drink product 401 and has 12 edges 301. In addition, the closed container 400 is connected to a lid comprising an opening aid 402, which lid covers the hole 305 on the outer face 101 of the sheetlike composite 100. Here, the lid 402 comprises a cutting tool as opening aid in its interior.

Figure 5:
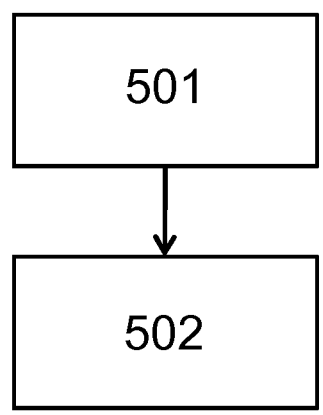
Figure 9:
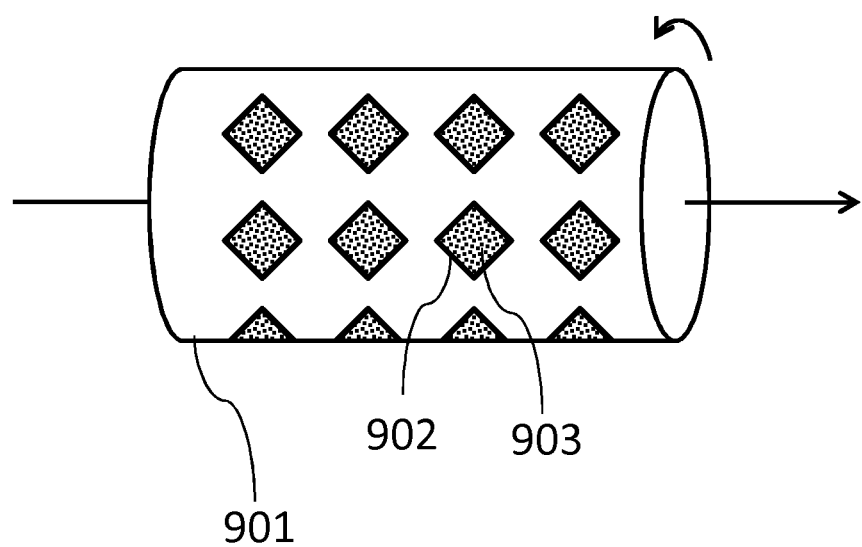

FIG. 5 shows a flow diagram of a process 500 according to the invention for printing a sheetlike composite precursor. In a process step a) 501, the sheetlike composite precursor composed of the following mutually superposing layers is provided: a further polymer layer 203 of LDPE 19N430 from Ineos GmbH, Cologne (basis weight 15 g/m$^2$); a carrier layer 104 of a Stora Enso Natura T Duplex twice-coated cardboard (Scott bond 200 J/m$^2$, residual moisture content 7.5%, basis weight 210 g/m$^2$); an intermediate polymer layer 105 of LDPE 19N430 from Ineos GmbH, Cologne (basis weight 18 g/m$^2$); a barrier layer 106 of an EN AW 8079 aluminium foil from Hydro Aluminium Deutschland GmbH (thickness 6 μm); an adhesion promoter layer 204 of Escor 6000 HSC from Exxon Mobil Corporation (basis weight 4 g/m$^2$) and LDPE 19N430 from Ineos GmbH, Cologne (basis weight 22 g/m$^2$); and an inner polymer layer 205 composed of a blend of 65% by weight of LDPE 19N430 from Ineos Köln GmbH and 35% by weight of Eltex 1315 AZ from Ineos Köln GmbH (blend basis weight 10 g/m$^2$). In a process step b) 502, a liquid first polymer layer precursor composition 903 is applied by intaglio printing to a side of the further polymer layer 203 that is facing away from the carrier layer 104. This is done by contacting the further polymer layer 203 with a first printing form surface 901 of a first printing form 900. The printing form 900 is shown in FIG. 9.

Figure 6:
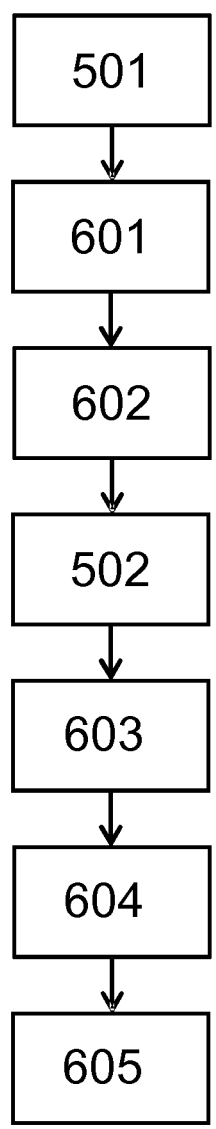

FIG. 6 shows a flow diagram of a further process 500 according to the invention for printing a sheetlike composite precursor. The sheetlike composite 100 in FIG. 2 is obtained by means of the process 500. In a process step a) 501, the sheetlike composite precursor is provided. For this purpose, a further polymer layer 203 of LDPE 19N430 from Ineos GmbH, Cologne (basis weight 15 g/m$^2$) is applied by laminar extrusion to a carrier layer 104 of a Stora Enso Natura T Duplex twice-coated cardboard (Scott bond 200 J/m$^2$, residual moisture content 7.5%, basis weight 210 g/m$^2$). Thereafter, an intermediate polymer layer 105 of LDPE 19N430 from Ineos GmbH, Cologne (basis weight 18 g/m$^2$) and a barrier layer 106 of an EN AW 8079 aluminium foil from Hydro Aluminium Deutschland GmbH (thickness 6 μm) are applied by lamination to a side of the carrier layer 104 that is opposite the further polymer layer 203. Furthermore, an adhesion promoter layer 204 of Escor 6000 HSC from Exxon Mobil Corporation (basis weight 4 g/m$^2$) and LDPE 19N430 from Ineos GmbH, Cologne (basis weight 22 g/m$^2$) and also an inner polymer layer 205 composed of a blend of 65% by weight of LDPE 19N430 from Ineos Köln GmbH and 35% by weight of Eltex 1315 AZ from Ineos Köln GmbH (blend basis weight 10 g/m²) are applied by laminar extrusion to a side of the barrier layer 106 that is facing away from the carrier layer 104. In a following process step i) 601, a surface tension of an outer surface of the sheetlike composite precursor, i.e. in this case a surface of the further polymer layer 203, is increased to 42 dyn/cm by a corona treatment with an input power of 4400 W at a web speed of the sheetlike composite precursor of 600 m/min. In a further process step ii) 602, in which can be performed after, before or at the same time as the process step i) 601, a liquid first polymer layer precursor composition 903 is obtained by mixing of a first composition component with a further composition component. The first composition component comprises a first colourant, and the further composition component comprises aromatic groups and aliphatic groups giving a ratio of the respective proportions of 0.63. In a process step b) 502, the liquid first polymer layer precursor composition 903 is applied by intaglio printing to a side of the further polymer layer 203 that is facing away from the carrier layer 104. This is done by contacting the further polymer layer 203 with a first printing form surface 901 of a first printing form 900. The printing form 900 is shown in FIG. 9. In a following process step c) 603, the liquid first polymer layer precursor composition 903 is hardened at 30° C., thereby obtaining a first polymer layer 103 of a sheetlike composite 100. In a process step d) 604, the first polymer layer 103 is overlaid by a liquid first colour application precursor composition by intaglio printing on a side facing away from the carrier layer 104. The liquid first colour application precursor composition comprises a Pigment Yellow PY 13 and also PVB as binder. In a process step e) 605, the first polymer layer 103 is overlaid by a liquid further colour application precursor composition by intaglio printing on the side facing away from the carrier layer 104. The liquid further colour application precursor composition comprises a Pigment Blue PB15:3 and also PVB as binder.

Figure 7:
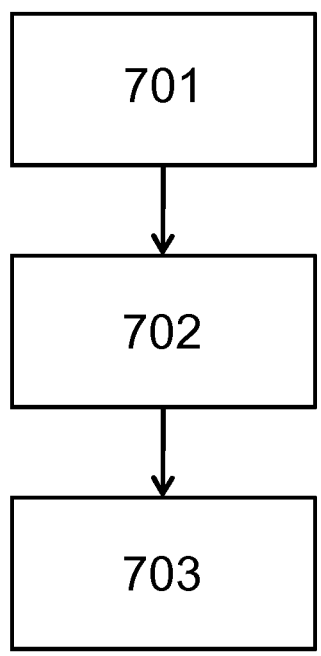

FIG. 7 shows a flow diagram of a process 700 according to the invention for producing a container precursor 300. In a process step a. 701, the sheetlike composite 100 according to FIG. 2 is provided. This comprises a first longitudinal rim and a further longitudinal rim. In a process step b. 702, the sheetlike composite 100 is folded. In a process step c. 703, the first longitudinal rim and the further longitudinal rim are pressed against one another and joined to one another by heat-sealing. Thus, a longitudinal seam 302 is obtained. According to the above description, the container precursor 300 according to FIG. 3 is produced.

Figure 8:
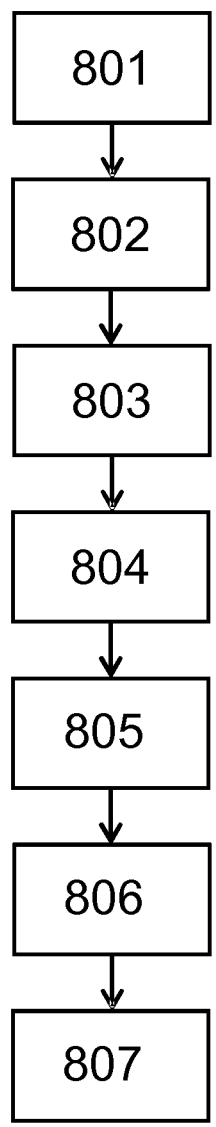

FIG. 8 shows a flow diagram of a process 800 according to the invention for producing a closed container 400. In a process step A) 801, the container precursor 300 according to FIG. 3 is provided. In a process step B) 802, a base region 304 of the container precursor 300 is formed by folding the sheetlike composite 100. In a process step C) 803, the base region 304 is closed by sealing with hot air of a temperature of 300° C. In a process step D) 804, the container precursor 300 is filled with a food or drink product 401 and, in a process step E) 805, the container precursor 300 is closed by sealing in a top region 303, thereby obtaining the closed container 400. In a process step F) 806, the closed container 400 is connected to an opening aid 402. In a process step G) 807, the food or drink product 401 in the closed container 400 is preserved in a pressure chamber under a chamber pressure of 2 bar at a temperature of 110° C. in the presence of water vapour.

FIG. 9 shows a schematic diagram of a first printing form 900. The first printing form 900 is an intaglio print roll comprising a first printing form surface 901 which comprises a first multitude of recesses 902. The recesses 902, in this case wells 902, are characterized by a holding volume of 9 ml per m² of the first printing form surface 901. The wells 902 of the first printing form surface 901 are all identical. The wells 902 comprise only part of the liquid first polymer layer precursor composition 903, since the wells 902 have been overfilled. Accordingly, the first printing form surface 901 has also been wetted with the liquid first polymer layer precursor composition 903 outside the wells 902. The liquid first polymer layer precursor composition 903 consists of 100 parts of a first composition component and 20 parts of a further composition component. The first composition component consists of 14.1% by weight of $TiO_2$ (rutile type), 63.1% by weight of ethyl acetate as solvent, 11.2% by weight of polyvinyl chloride as binder, 3.9% by weight of a polyester containing OH groups from adipic acid as crosslinker, and additives. The further composition component consists of 56% by weight of ethyl acetate as solvent, 24% by weight of an aromatic polyisocyanate based on tolylene diisocyanate and 20% by weight of an aliphatic polyisocyanate based on hexamethylene diisocyanate (HDI) with trimethylolpropane. The liquid first polymer layer precursor composition 903 comprises aromatic groups and aliphatic groups in a ratio of their proportions of 0.30.

LIST OF REFERENCE SIGNS

100 Sheetlike composite according to the invention
101 Outer face
102 Inner face
103 First polymer layer
104 Carrier layer
105 Intermediate polymer layer
106 Barrier layer
201 First colour application
202 Further colour application
203 Further polymer layer
204 Adhesion promoter layer
205 Inner polymer layer
300 Container precursor according to the invention
301 Edge
302 Longitudinal seam
303 Top region
304 Base region
305 Hole
306 Groove
400 Closed container according to the invention
401 Food or drink product
402 Lid with opening aid
500 Process according to the invention for printing a sheetlike composite precursor
501 Process step a)
502 Process step b)
601 Process step i)
602 Process step ii)
603 Process step c)
604 Process step d)
605 Process step e)
700 Process according to the invention for producing a container precursor
701 Process step a.
702 Process step b.
703 Process step c.

800 Process according to the invention for producing a closed container
801 Process step A)
802 Process step B)
803 Process step C)
804 Process step D)
805 Process step E)
806 Process step F)
807 Process step G)
900 First printing form/intaglio print roll
901 First printing form surface
902 Recess/well
903 Liquid first polymer layer precursor composition

The invention claimed is:

1. A sheetlike composite comprising, as layers of a layer sequence in the direction from an outer face of the sheetlike composite to an inner face of the sheetlike composite,
   a) first colour application, which is a chromatic ink application,
   b) a first polymer layer, which is a white primer layer,
   c) a further polymer layer, which is a polyolefin layer,
   d) a carrier layer, and
   e) a barrier layer,
   wherein the first polymer layer is characterized by a ratio of a proportion of aromatic groups in the first polymer layer to a proportion of carbonyl groups in the first polymer layer in a range from 0.18 to 0.34,
   wherein the ratio of the proportion of aromatic groups in the first polymer layer to the proportion of carbonyl groups in the first polymer layer is determined by
   measuring an ATR spectrum that covers a wave number range from 3500 to 1400 $cm^{-1}$ with a resolution of 4 $cm^{-1}$ is recorded at 45° by means of a diamond as detector tip, and
   calculating the ratio of the area of a maximum of the ATR spectrum in the wave number range from 1590 to 1610 $cm^{-1}$ to the area of a maximum of the ATR spectrum in the wave number range from 1720 to 1740 $cm^{-1}$,
   wherein the first polymer layer is further characterized by a ratio of a proportion of aliphatic groups in the first polymer layer to the proportion of carbonyl groups in the first polymer layer in a range from 0.40 to 0.60,
   wherein the ratio of the proportion of aliphatic groups in the first polymer layer to the proportion of carbonyl groups in the first polymer layer is determined by
   measuring an ATR spectrum that covers a wave number range from 3500 to 1400 $cm^{-1}$ with a resolution of 4 $cm^{-1}$ is recorded at 45° by means of a diamond as detector tip, and
   calculating the ratio of the area of a maximum of the ATR spectrum in the wave number range from 2900 to 2950 $cm^{-1}$ to the area of a maximum of the ATR spectrum in the wave number range from 1720 to 1740 $cm^{-1}$.

2. The sheetlike composite according to claim 1, wherein the first polymer layer further comprises a first colorant in a proportion in a range from 10 to 50% by weight, based on the weight of the first polymer layer.

3. A container precursor comprising the sheetlike composite according to claim 1.

4. A closed container comprising the sheetlike composite according to claim 1.

5. A process for producing the sheetlike composite according to claim 1, the process comprising, as process steps,
   a) providing a sheetlike composite precursor comprising, as mutually superposing layers of a layer sequence,
      i) the further polymer layer,
      ii) the carrier layer, and
      iii) the barrier layer;
   b) overlaying the carrier layer with a liquid first polymer layer precursor composition on a side facing away from the barrier layer and obtaining the first polymer layer from the liquid first polymer layer precursor composition,
   c) overlaying the carrier layer with a liquid first colour application precursor composition on a side facing away from the barrier layer and obtaining the first colour application from the liquid first colour application precursor composition, wherein the liquid first polymer layer precursor composition is characterized by a ratio
   of a proportion of aromatic groups in the liquid first polymer layer precursor composition to a proportion of aliphatic groups in the liquid first polymer layer precursor composition in a range from 0.30 to 0.80,
   wherein the ratio of the proportion of aromatic groups in the liquid first polymer layer precursor composition to the proportion of aliphatic groups in the liquid first polymer layer precursor composition is determined by
   measuring an ATR spectrum that covers a wave number range from 3500 to 1400 $cm^{-1}$ with a resolution of 4 $cm^{-1}$ is recorded at 45° by means of a diamond as detector tip, and
   calculating the ratio of the area of a maximum of the ATR spectrum in the wave number range from 1590 to 1610 $cm^{-1}$ to the area of a maximum of the ATR spectrum in the wave number range from 2900 to 2950 $cm^{-1}$.

6. A sheetlike composite obtainable by the process according to claim 5.

7. A process comprising, as process steps,
   a. providing the sheetlike composite according to claim 1, wherein the sheetlike composite further comprises a first longitudinal rim and a further longitudinal rim;
   b. folding the sheetlike composite; and
   c. contacting and joining the first longitudinal rim to the further longitudinal rim, thereby obtaining a longitudinal seam.

8. A container precursor obtainable by the process according to claim 7.

9. A process comprising, as process steps,
   A) providing the container precursor according to claim 3;
   B) forming a base region of the container precursor by folding the sheetlike composite;
   C) closing the base region;
   D) filling the container precursor with a food or drink product, and
   E) closing the container precursor in a top region, thereby obtaining a closed container.

10. A closed container obtainable by the process according to claim 9.

* * * * *